United States Patent
Ziegler et al.

(10) Patent No.: US 10,198,159 B2
(45) Date of Patent: Feb. 5, 2019

(54) MULTI-CONTEXT SENSOR DATA COLLECTION, INTEGRATION, AND PRESENTATION

(71) Applicant: OSIsoft, LLC, San Leandro, CA (US)

(72) Inventors: Matthew James Ziegler, Pleasanton, CA (US); Ivan Datskov, Richmond, CA (US)

(73) Assignee: OSIsoft, Inc., San Leandro, CA (US)

( * ) Notice: Subject to any disclaimer, the term of this patent is extended or adjusted under 35 U.S.C. 154(b) by 359 days.

(21) Appl. No.: 15/084,404

(22) Filed: Mar. 29, 2016

(65) Prior Publication Data

US 2016/0321330 A1 Nov. 3, 2016

Related U.S. Application Data

(60) Provisional application No. 62/153,956, filed on Apr. 28, 2015.

(51) Int. Cl.
*G06F 3/0484* (2013.01)
*G06F 3/0486* (2013.01)
*G06F 3/0481* (2013.01)

(52) U.S. Cl.
CPC ........ *G06F 3/04842* (2013.01); *G06F 3/0486* (2013.01); *G06F 3/04817* (2013.01)

(58) Field of Classification Search
CPC ........ G06F 3/0484; G06F 17/30; G06F 17/24; G06F 3/04842
See application file for complete search history.

(56) References Cited

U.S. PATENT DOCUMENTS

| | | | |
|---|---|---|---|
| 6,615,207 B1 | 9/2003 | Lawrence | |
| 2010/0076992 A1 | 3/2010 | Barstow | |
| 2011/0047169 A1 | 2/2011 | Leighton et al. | |
| 2013/0103657 A1 | 4/2013 | Ikawa et al. | |
| 2013/0318236 A1* | 11/2013 | Coates | H04L 41/22 709/224 |

FOREIGN PATENT DOCUMENTS

WO   WO 2015/023482 A1   2/2015

OTHER PUBLICATIONS

PCT International Search Report and Written Opinion, PCT Application No. PCT/US2016/029591, dated Aug. 1, 2016, ten pages.
Wikipedia, Time series database as edited by Rodionos Mar. 11, 2015, four pages, [online] [retrieved from the internet Aug. 16, 2016], Retrieved from the internet <https://en.wikipedia.org/w/index.php?title=Time_series_database&oldid=650955116>.

* cited by examiner

*Primary Examiner* — Andrea C Leggett
(74) *Attorney, Agent, or Firm* — Fenwick & West LLP

(57) ABSTRACT

A data integration system accesses a time series database and an asset relational database. The asset relational database is comprised of a plurality of asset nodes related in a hierarchical structure. Each asset node may represent a physical asset in an industrial setting. The data integration system displays a graphical representation of the hierarchical structure of the asset relational database, receives user input selecting an asset node from the hierarchical structure, and displays a hierarchical search template based on the selected asset node. The data integration system searches the asset relational database for matching asset nodes and retrieves corresponding time series data from the time series database. The data integration system generates a report from the retrieved data.

20 Claims, 25 Drawing Sheets

FIG. 4F

Create View

Select Data > Modify View > Publish

[ Publish ]

[ Add Columns ]  [ Edit Timefra... ]

| Timestamp | Asset | Sensor | Tim... |
|---|---|---|---|
| 1:27:03 | 100A | 102A | |
| 1:27:04 | 100A | 102A | |
| 1:27:05 | 100A | 102A | |
| 1:27:06 | 100A | 102A | |
| 1:27:07 | 100A | 102A | |
| 1:27:08 | 100A | 102A | |
| 1:27:09 | 100A | 102A | |
| 1:27:10 | 100A | 102A | |
| 1:27:11 | 100A | 102A | |
| 1:27:12 | 100A | 102A | |
| 1:27:13 | 100A | 102A | |
| 1:27:14 | 100A | 102A | |
| 1:27:15 | 100A | 102A | 59 |
| 1:27:16 | 100A | 102A | 60 |
| 1:27:17 | 100A | 102A | 64 |
| 1:27:18 | 100A | 102A | 63 |

Row Filters  ✕
- 508 Numeric
- 510 String
- 512 Digital
- 514 Event Frame
- 516 Null Values

FIG. 5B

MULTI-CONTEXT SENSOR DATA COLLECTION, INTEGRATION, AND PRESENTATION

CROSS REFERENCE TO RELATED APPLICATIONS

This application claims the benefit of U.S. Provisional Application No. 62/153,956, filed Apr. 28, 2015, which is incorporated by reference in its entirety.

BACKGROUND

Field of Disclosure

This disclosure relates to the field of data collection, organization, visualization, and data querying.

Description of the Related Art

Many industrial software applications retrieve data from one or more databases and render that data in a user interface. The user interacts with the data in order to make decisions. There are many possible sources of data including, for example, time series historian, relational database and web service data. The structure of data in each of these data sources is different as are the techniques for querying each data source. Each data source requires that some information be provided by the application in order to select the data of interest to the application user. These inputs are called query parameters. Specifying different query parameter values causes the data source to return different sets of results. In typical industrial software applications, a large number of individual queries are may be required to retrieve a dataset from multiple sources of data. Alternatively, data retrieval scripts may be written to retrieve the appropriate data.

SUMMARY

The following disclosure pertains to a data integration system for data stored in multiple databases, such as a time series database and an asset relational database. The data integration system accesses the time series database and the asset relational database. The time series database comprises times series data from a plurality of physical assets. The asset relational database is comprised of a plurality of asset nodes related in a hierarchical structure. The data integration system displays a graphical representation of the hierarchical structure of the asset nodes of the asset relational database in a graphical user interface. The data integration system receives user input selecting an asset node of the hierarchical structure from the graphical representation in the graphical user interface. The data integration system then displays, in the graphical user interface, a hierarchical search template (also referred to as a "shape tree") based on the selected asset node and optionally with one or more other asset nodes from the hierarchical structure. The data integration system then searches the asset relational database with a search query corresponding to the hierarchical search template to identify one or more matching asset nodes. The data integration system retrieves a portion of the time series data corresponding to the matching asset nodes from the time series database. The data integration system generates a data report based on the retrieved portion of the time series data. The data integration system may then export the data report. In some embodiments, the data integration system may be configured to export the data in an XML or JSON format.

BRIEF DESCRIPTION OF DRAWINGS

FIGS. 4A-4J illustrate a series of user interfaces used to generate a query for the databases in accordance with one embodiment.

FIGS. 5A-5D illustrate steps of a user interface for filtering and formatting output data in accordance with one embodiment.

DETAILED DESCRIPTION

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures. It is noted that wherever practicable similar or like reference numbers may be used in the figures and may indicate similar or like functionality.

The method described herein solves the technical challenge of accurately and quickly integrating data from multiple databases resulting in a set of output data according to user input. Industrial data collection applications often accumulate large amounts of data that may take months to sift through. The disclosed method provides a querying interface that allows a user to intuitively query a time series database, an asset relational database, and an event database in a way that creates a useful data set for analysis without a large number of manual queries to the database.

Figure 1:
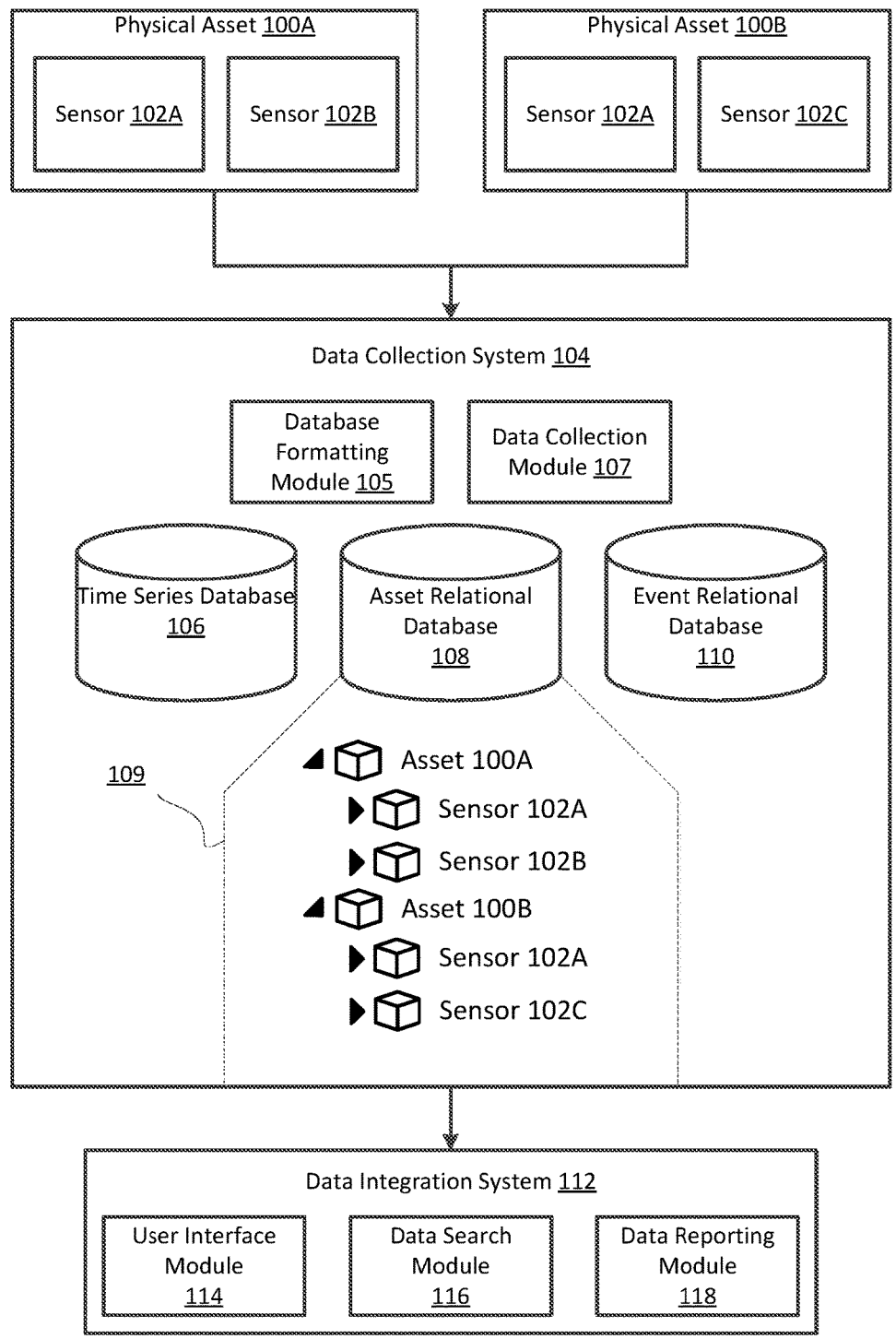
FIG. 1 is a block diagram illustrating an embodiment of an environment for multi-context data collection and integration in accordance with one embodiment.

FIG. 1 is a block diagram illustrating an embodiment of an environment for multi-context data collection and integration. The environment for multi-context data collection and integration is comprised of a number of data sources including one or more physical assets 100 (100A and 100B are shown). Examples of physical assets 100 are oil rigs, weather stations, power plants, etc.

Each physical asset 100 may have a plurality of sensors 102 that detect data about a physical phenomenon. Examples of sensors are temperature sensors, pressure sensors, voltage sensors, speed sensors, etc. A sensor 102 may be any type of data source and may not necessarily be a physical object that acquires data from a physical source. For example a sensor 102 may be a pressure sensor or it may simply represent a particular statistic being measured on a server or other computer. In the example of FIG. 1, sensors 102A and 102B are associated with physical asset 100A. Physical asset 100B also has a separate instance of sensor 102A associated with it along with another sensor 102C. The physical asset 100 may have fewer or more sensors 102 and the sensors themselves may be considered physical assets 100 and may contain multiple sources of time series data. These physical assets and sensors are represented 109 as data in the asset relational database 108.

The multi-context data collection and integration environment also contains a data collection system 104 and a data integration system 112. Each system may be instantiated on a single server or may be comprised of multiple servers each serving different functions of the systems. Each of the servers involved in the data collection system 104 and the data integration system 112 may communicate with each other over any local or wide area network including the Internet.

The database formatting module 105 provides an interface for the user of the data collection system 104 to specify the structure and content of the time series database 106, the asset relational database 108, and the event relational database 110. The database formatting module 105 allows the user to create entries in the time series database and link them with data streams from particular sensors 102 or data acquisition devices. The database formatting module 105 also allows the user to define nodes in the asset relational database 108 and create associations with the time series database and the event relational database 110. The database formatting module 105 allows user to further define attributes of the node. Asset templates may also be created in order to set up a number of nodes with the same attribute structure. The database formatting module 105 also allows the user to define events in the event relational database 110. The database formatting module 105 provides an interface for user to define the time period of an event and the relationship of the event with assets in the asset relational database 108 and time series 200 in the time series database 106. The structuring options provided by the database formatting module 105 are further discussed in relation to each of the databases in the data collection system 104.

The data collection system 104 receives data from the sensors 102 associated with the physical assets 100 and stores the data in the time series database 106. The data collection system 104 collects this data using the data collection module 107. The data collection module 107 receives data transmitted from data acquisition devices that retrieve data from the sensors 102. The data acquisition devices may transmit the data over a local area or wide area network, including the Internet. In some embodiments received data is already time stamped upon receipt by the data collection module 107, in other embodiments the data collection module 107 may assign a time stamp for each incoming value of time series data. In many cases, received data from different sensors 102 has been recorded using differing time keeping conventions or units in these cases the data collection module 107 may convert the time stamps to a standard format and units or any format specified by the user. After receiving the data from the sensors 102 and assigning or modifying the timestamps as necessary, the data collection module 107 stores each received sensor value and corresponding time stamp in the time series database 106.

Figure 2A:
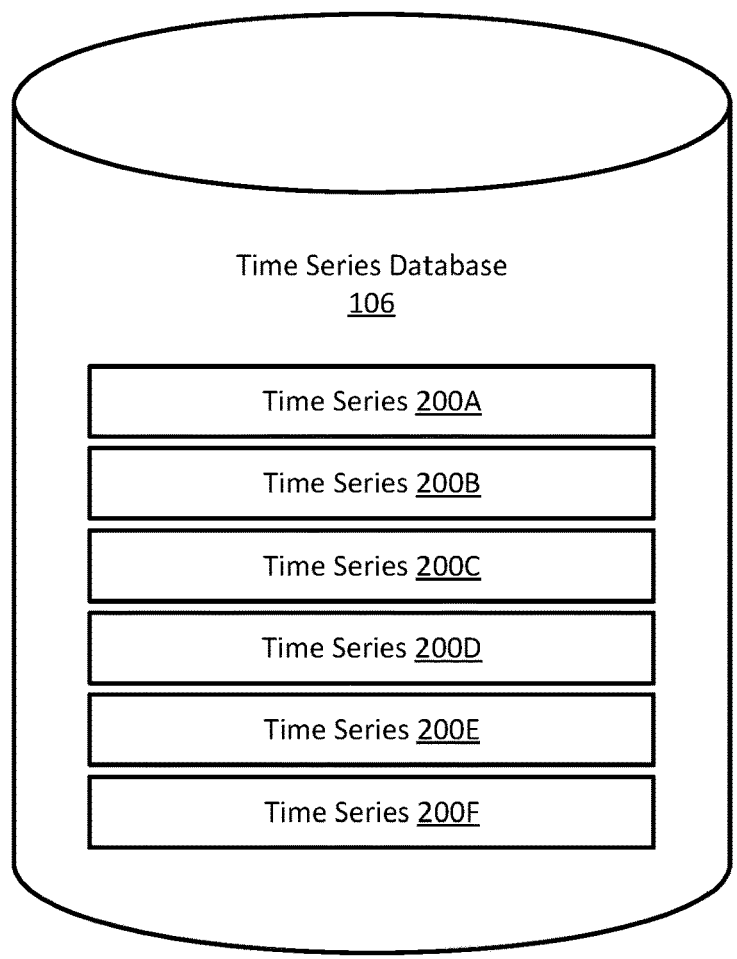
FIGS. 2A-C are block diagrams illustrating a detailed view of the time series database, the asset relational database, and the event relational database in accordance with one embodiment.

FIG. 2A is a block diagram illustrating a detailed view of the time series database 106 in accordance with one embodiment. The time series database 106 is comprised of multiple entries in a table for each time series data group 200. Each time series data group 200 contains data values collected from a particular sensor 102. The time series data group 200 may be stored using any time series database type including OpenTSDB, OSIsoft PI, or any other proprietary database software. Each data value in a time series data group 200 is accompanied by a timestamp corresponding to the time at which that piece of data was recorded.

Figure 2B:
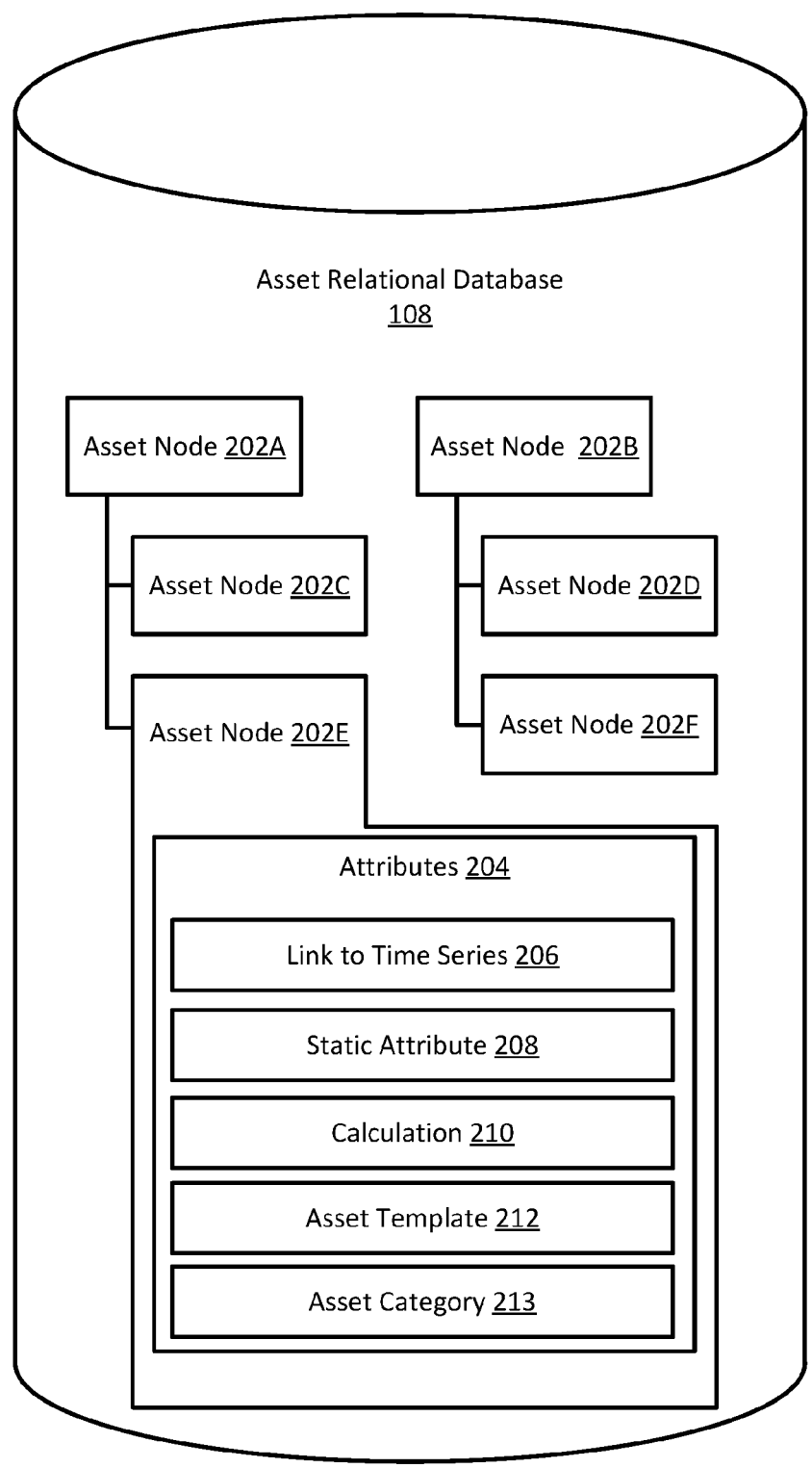

FIG. 2B is a block diagram illustrating a detailed view of the asset relational database 108 in accordance with one embodiment. The asset relational database 108 is comprised of a number of nodes 202 in a relational tree structure. Each node may represent a physical asset 100 or may be an organizational node 202 used to provide context to the nodes 202 representing physical assets 100. In some embodiments, the nodes 202 and the structure of asset relational database 108 are specified using an XML, data model.

Referring again to the example of the weather station, a weather station is a physical asset 100 that would be represented by a node 202. In the case of a weather organization with multiple weather stations, it might be advantageous to organize the weather stations into regional groups. For example, there might be a group of weather stations located in a region like San Francisco and an additional region for San Jose. Therefore the individual weather station nodes 202 that represent a physical asset 100 might be subordinate to nodes 202 representing the San Francisco region or the San Jose region. These weather regions would be represented as nodes 202 within the system but they would not correspond to a particular physical asset 100 and instead are used to group or organize the subordinate nodes in the asset relational database 108.

In FIG. 2B, nodes 202A and 202B are superior nodes, where node 202A has subordinate nodes 202C and 202E while node 202B has subordinate nodes 202D and 202F. Each node 202 in the asset relational database 108 may have attributes 204. Attributes 204 include links to time series data groups 206 in the time series database 106, static attributes 208, and calculations 210. Each node 202 need not have all of these attributes 204 but may have at least one of each type of attribute 204.

A link to time series data group 206 is a reference to a location of a particular time series data group 200 of the time series database 106. Any type of node 202 (e.g. superior or organizational nodes) may be linked to a time series data group 200. The link to a time series database 206 can be used to query the time series database 106 for an entire time series data group 200.

A static attribute 208 is a variable that may be defined by the user and associated with organizational or representative nodes 202. A static attribute may be a numerical value or a categorical label. For example, in the case of system of weather stations, a static value of a node representing a weather station might be set as the global coordinates (e.g. longitude/latitude) of that weather station. Alternatively, a node 202 representing a weather station may have a categorical static attribute indicating a category of the local environment (coastal, desert, mountain, etc.). A static attribute 208 of a node 202 will remain the same value unless edited by the user of the data collection system 104.

A calculation 210 is a user defined formula or equation that may operate on time series data 200 and static attributes 208. A user may define a calculation 210 for a node, using the database formatting module 105, by creating references to time series data 200 directly in the formula or by referencing links to time series data 206 in nodes 202 of the asset relational database depending on the embodiment. In either case, the calculation 210 may be applied to each entry in a time series data group 200. The formula for a calculation 210 may include any mathematical relation or function including any statistical calculations or logical operations and inequalities. In addition, a calculation 210 may be configured to use the sampling times of a particular time series data group 200 or a custom sampling rate and offset from the samples of the time series data group 200 used in the calculation 210. Depending on the sampling rate chosen for the calculation 210, there may be more or fewer values generated in the calculation than in the time series data group 200 used in the calculation. Calculations 210 may be evaluated only if the user chooses to export the calculation data or it may be updated in real time as a separate column in the time series database 106 depending on the embodiment.

Again referring to the weather station example, a user might create a calculation 210 for a node 202 representing a region containing a number of weather stations. The user may define the calculation 210 to be a formula that determines the average temperature for the region represented by the node 202. The calculation 210 would reference temperature data from time series links 206 in the subordinate nodes representing each weather station in the region. The average temperature of the region can be calculated. Additionally, each weather station may have a correction weight assigned to it, as a static attribute 208, such that its contribution to the average temperature for this region is scaled appropriately. Thus, at a user determined sampling rate, a weighted average of temperatures in a region could be calculated.

An asset template label 212 is a label associated with a node 202 that was created using a particular asset template. In order to facilitate the creation of nodes in the asset relational database 108, the database formatting module 105 may enable the user to create asset templates. Each asset template defines the particular attributes of a node 202 created using that template. Once an asset template is created a user can select the template and a new asset node 202 is created with attributes matching the template. In order to make finding similar nodes 202 in the asset relational database 108 easier, each node 202 created with the same asset template is associated with each other. Nodes 202 not created using a template are not assigned an asset template label 212.

An asset category 213 is a metadata label describing a category of an asset node 202. The asset category 213 allows for easy querying of all asset nodes 202 that fall into a particular asset category 213. Asset categories 213 are useful to organize disparate assets 202 into groups for easier analysis. Asset categories 213 allow an additional organization tool for assets 202 in addition to the hierarchical structure of the asset relational database 108. For example, a user of a data collection system 104 for a set of weather stations might create an asset category 213 called "Wind Speed Instruments," which could be used to label a number of wind speed instrument nodes independent of the type of wind instrument or the template used to create the nodes 202 representing those wind speed instruments.

Figure 2C:
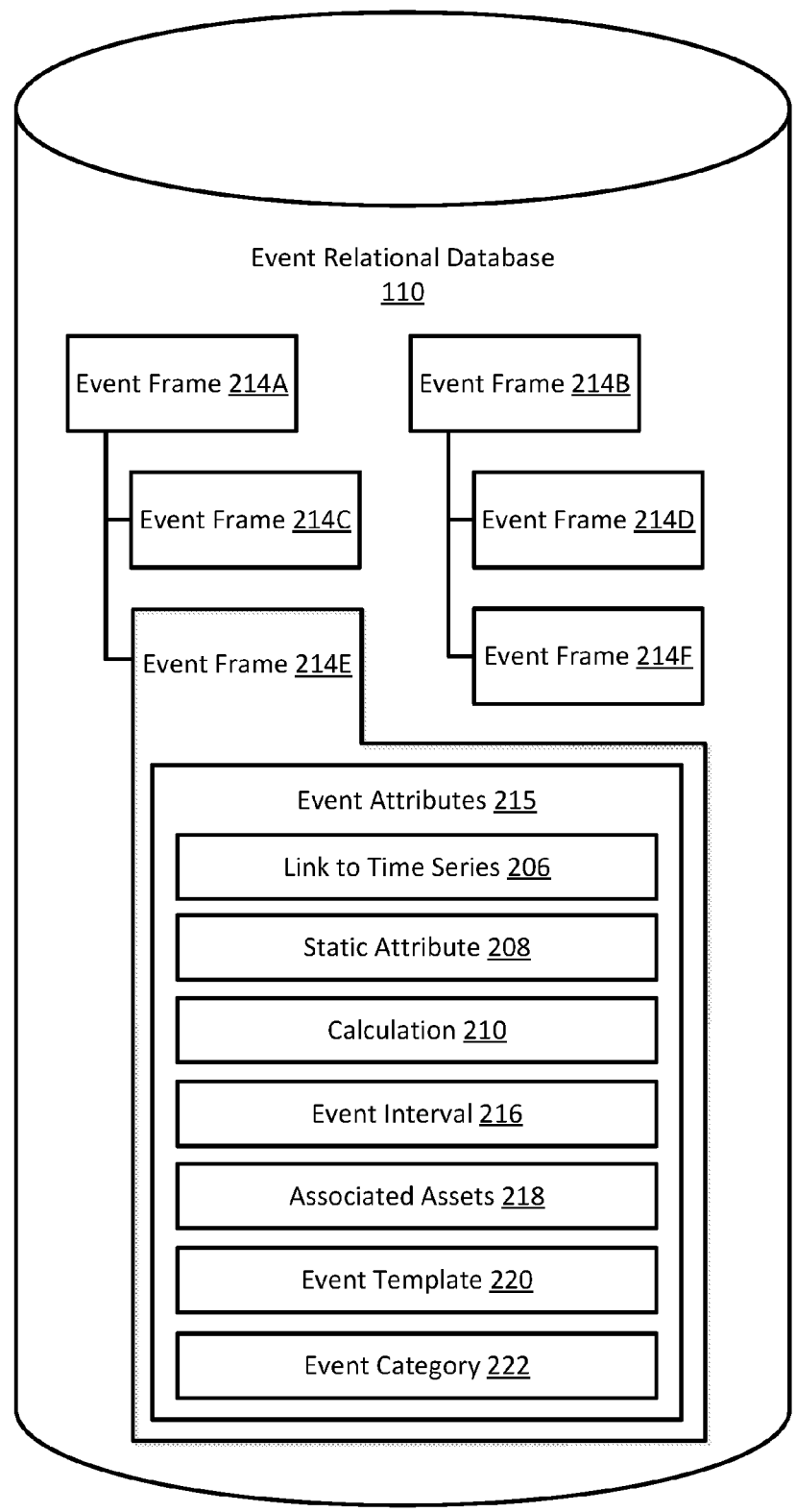

FIG. 2C is a block diagram illustrating a detailed view of an event relational database 110 in accordance with one embodiment. The event relational database 110 is used to keep track of events of interest to a user. The event relational database 110 is comprised of a number of event frames 214 (event objects 214A-214F are shown). Each event frame 214 represents a period of time that may be of interest to the user. Event frames 214 may be organized in list form (not shown) or in a relational tree structure. If the event frames 214 are organized in a relational tree structure, event frames 214 may be set up such that the superior event frames in the hierarchy encompass the subordinate event frames. For example, an event frame 214 for a batch process may be created denoting the entire duration of the process and it may have subordinate event frames 214 indicating each step in the process. Subordinate event frames 214 need not be contiguous in time and they may overlap depending on the embodiment. In some embodiments, the event relational database 110 is also encoded using an XML, data model. Each event frame 214 has event attributes 215 that may include links to time series data 206, static attributes 208, calculations 210, an event interval 216, associated assets 218, an event template label 220, and an event category 222. Depending on the event frame 214 and event relational database 110 setup some or all of these event attributes 215 may be included in an event frame 214.

Event frames 214 may be created by the user directly or they may be generated periodically according to a pattern specified by a user. For example, a user may specify that an event frame 214 be created to represent each day of data gathering. Thus data gathered during a particular day can be easily referenced. In some embodiments, events may be created automatically in response to the occurrence of a set of predefined event conditions. For example, in a data collection system 104 for a solar thermal power plant a user might define event conditions that correspond with low solar incidence to investigate generator output during low solar incidence conditions. Event conditions may be linked to the value of a particular time series data group 200 or any other indication readable by the data collection system 104.

Event frames 214 may be configured with the links to time series 206, static attributes 208, and calculations 210 in much the same way as asset nodes 202. In the same way that links to time series 206, static attributes 208, and calculations 210 that are associated with asset nodes 202 are contextualized by their association to the asset nodes 202, the same attributes may be further contextualized upon an association with an event frame 214. In some embodiments, links to time series 206, static attributes 208, and calculations 210 may be included as attributes in an event frame 214 without being associated with an asset node 202.

An event interval 216 is an interval of time that defines the time span of the event 214. The interval is comprised of a start time and an end time of the event. Thus any time series data group 200 that has a time stamp included in the event interval 216 would be included in the event frame 214. Instead of specifying an end time to an event interval 216, in some embodiments, a user may indicate that an event 214 is ongoing by not specifying an end time to an event interval 216. In this case the event interval 216 will always have an end time that is equal to the current time until edited by the user.

Associated assets 218 of an event frame 214 specify the asset nodes 202 (physical or otherwise) in the asset relational database 108 to which the event frame 214 is related. For example, in a data collection system 104 for weather stations a user may create an event for a storm that passes over San Jose. The user may then relate the event frame 214 to asset nodes 202 representing weather stations in the San Jose area.

An event template label 220 is similar to an asset template label 212, where an asset template 212 identifies the template from which an asset node 202 was created; an event template 220 identifies the event template from which an event node 214 was created. In some embodiments, an event template may be associated with the previously mentioned event conditions for the creation of an event node 214. In this way a template may be created to generate an event in response to a particular set of conditions.

An event category 222 is a metadata label describing a category of an event frame 214. The event category 222 allows for easy querying of all event frames 214 that fall into a particular event category 222. Event categories 222 are useful to organize disparate events into groups for easier analysis. Event categories allow an additional organization tool for events in addition to the hierarchical structure of the event relational database 110.

Referring back to FIG. 1, data integration system 112 provides a user interface for a user to extract data from the time series database 106 that corresponds to particular assets and particular events. This is accomplished by presenting the user with a series of graphical user interfaces through which the user can easily and intuitively formulate a complex query of the databases in the data collection system 104. The data integration system 112 includes three modules including a user interface module 114, a data search module 116, and a data reporting module 118.

The user interface module 114 presents user interfaces to the user and processes user inputs to that interface to interact with the data collection system 104. The interfaces provided allow the user to create a shape tree that is then used to find assets in portions of the relational tree structure of asset relational database 108 that match the shape tree. A shape tree is a graphical and hierarchical search template having a hierarchical tree shape. The shape tree can have multiple superior and subordinate levels. The shape tree may be matched to parts of the hierarchy stored in the asset relational database 108, which also has a hierarchical tree structure.

FIGS. 4A-4J show an example UI flow for the process of creating a shape tree using interfaces provided by the user interface module 114. The user interface module 114 also provides an interface for the user to select a relevant time frame for the queried data using events 214 from the event relational database 110. The example UI flow for selecting an event frame for a set of data is shown in FIGS. 5A-5D.

Data search module 116 creates a database search query for the database from the shape tree. The data search module 116 takes in input shape tree specifying a particular branch in the relational tree structure of the asset relational database 108. A branch in the asset relational database 108 can include any set of linked nodes 202 and attributes 204 from the asset relational database 108. In addition to selecting specific branches from the asset relational database 108 the user may add flexible search nodes to the shape tree. If any of these flexible search nodes are present in a provided shape tree the data search module 116 will locate any branches that match the structure of shape tree and the provided flexible search node. Examples of this function of the data search module 116 are illustrated in FIGS. 3A-3E.

The data search module 116 may use any suitable search algorithm to locate matches in the asset relational database 108. In some embodiments that utilize XML, data models for the asset relational database 108, holistic twig pattern matching may be used to find matching instances of a given shape tree.

Figure 3A:
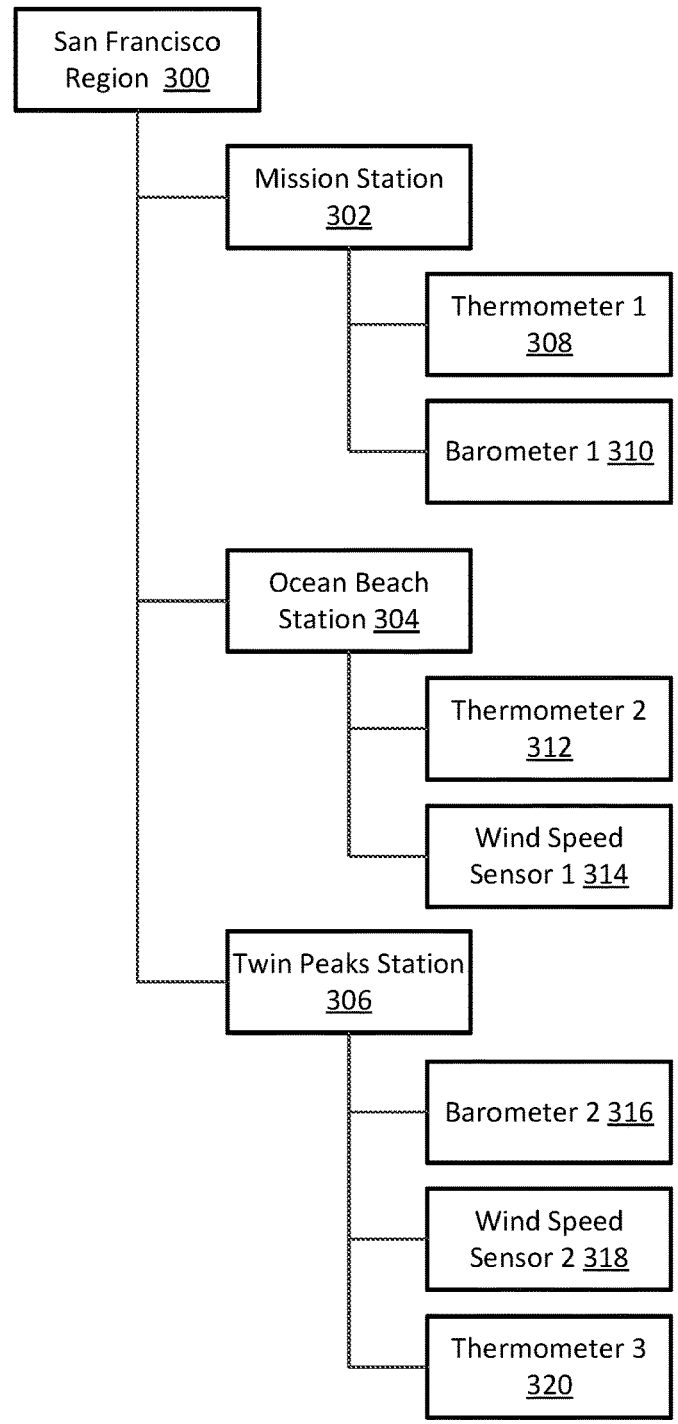
FIGS. 3A-3E are a block diagrams illustrating an example asset relational database for a set of weather stations and possible shape trees and corresponding matches for the example database in accordance with one embodiment.

FIGS. 3A-3E are a block diagrams illustrating an example asset relational database for a set of weather stations and possible shape trees and corresponding matches for the example database in accordance with one embodiment. FIG. 3A shows an asset relational database 108 representing weather stations in the San Francisco Region 300, which is an organizational node 202. The San Francisco Region node 300 has three subordinate nodes Mission Station node 302, Ocean Beach Station node 304, and Twin Peaks Station node 306. Each of these nodes 202 has attributes 204 (in this case all attributes are links to time series data 206). Mission Station node 302 has attributes including thermometer 1 308 and barometer 1 310. Ocean Beach Station node 304 has attributes including thermometer 2 312 and wind speed sensor 1 314. Twin Peaks Station node 306 has attributes including barometer 2 316, wind speed sensor 2, and thermometer 3.

Figure 3B:
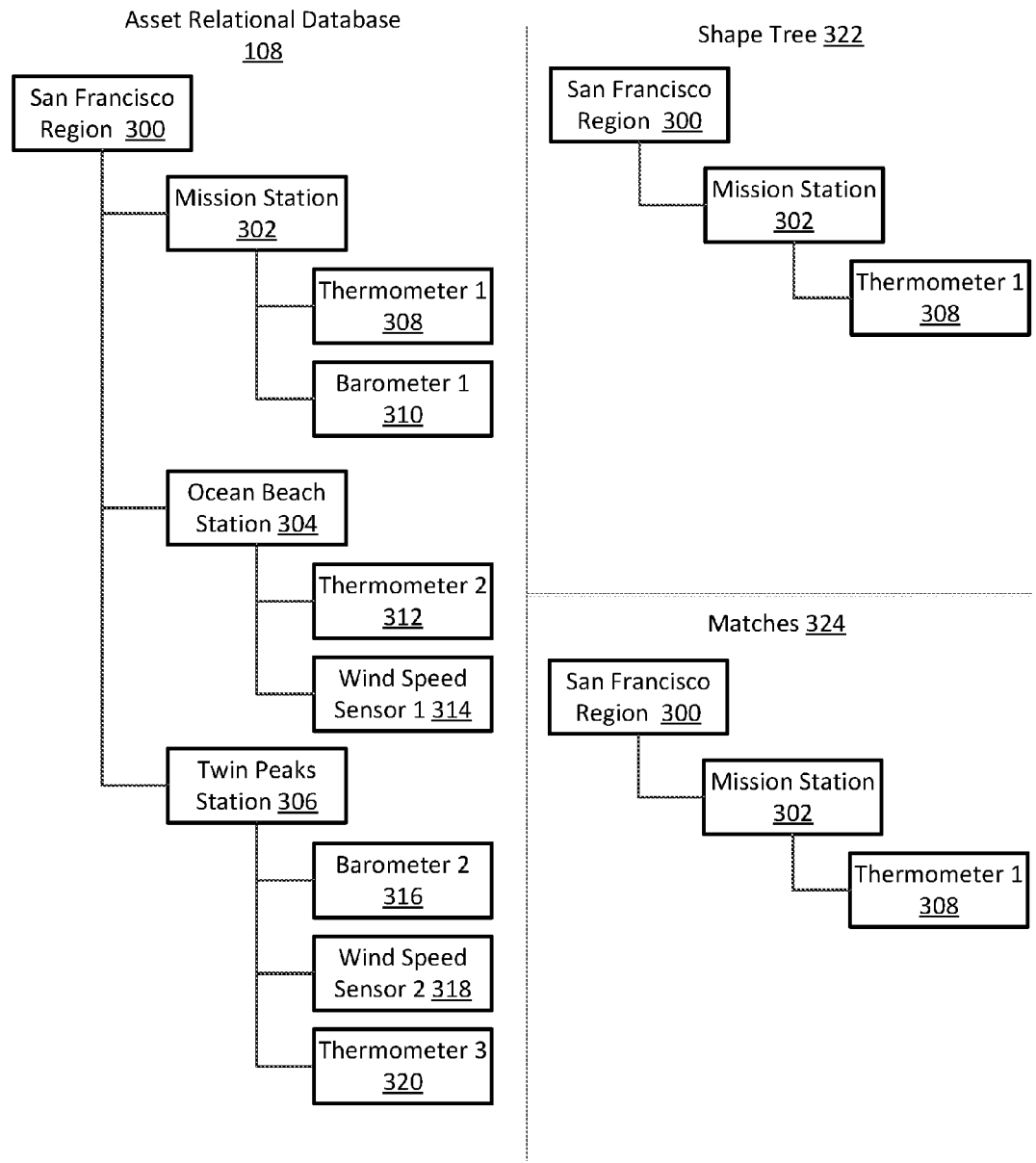

FIG. 3B illustrates a shape tree 322 defined by the user and the matches 324 determined by the data search module 116 given the asset relational database 108 described above. The user defines a shape tree 322 including the San Francisco region node 300, the Mission station node 302, and thermometer 1 308. The shape tree 322 is a hierarchical search template that includes multiple superior and subordinate levels. The data search module 116 finds an exact match of the specified shape tree in the asset relational database 108, which is comprised of the same nodes. Upon finding matching asset nodes 202 for the hierarchical search template the data search module 116 retrieves attributes associated with a matching asset node 202. If those attributes are links to time series data 206 or calculations 210 the data search module 116 retrieves the data from the time series database 106.

Figure 3C:
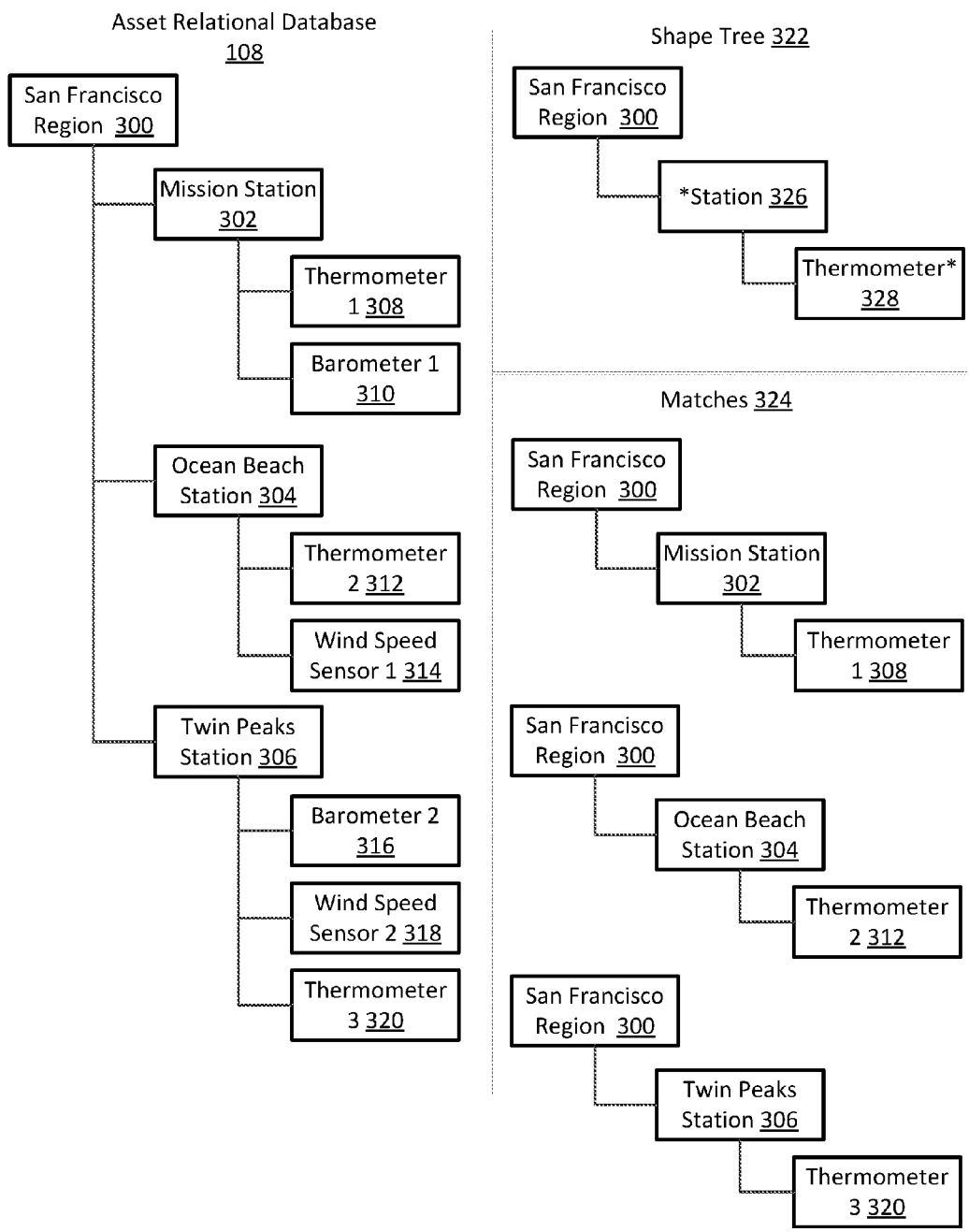

FIG. 3C illustrates a second shape tree 322 defined by a user and the corresponding matches 324 determined by the data search module 116. In this case, the shape tree 322 includes two flexible search nodes 326 and 328. "Station" indicates a flexible search node where any node 202 with a name ending in "Station" is considered a valid result by the data search module 116. "Thermometer*" is also a flexible search node in the shape tree 322 that specifies that any attribute with a name beginning in "Thermometer" is an acceptable result. In some embodiments, typical logical expressions may also be included in flexible search nodes to further aid the user in specifying a query. In this case, the data search module 116 finds all of the permutations of Station nodes and thermometers that exist in the asset relational database 108. The result are thermometers 1 308, 2 312, and 3 320.

Figure 3D:
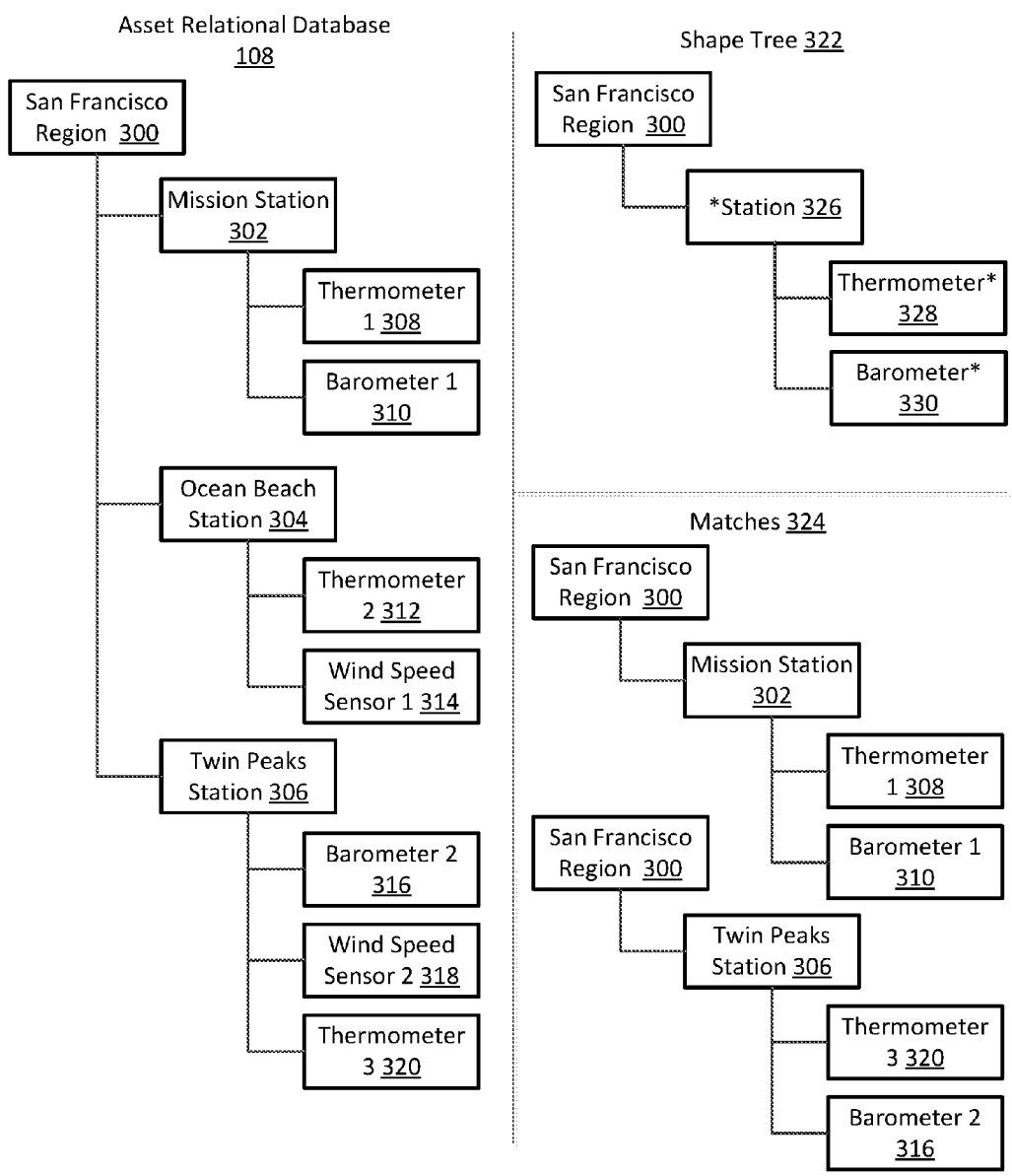

FIG. 3D illustrates a third possible shape tree 322 specified by a user. In this case, the user has specified that an additional flexible search node, "Barometer*" 330 under the "Station" node 326. The data search module 116 interprets that the user is searching for any node 202 with a name ending in "Station" that has attributes with names beginning with "Temperature" and "Barometer." This time the data search module 116 returns only temperature 1 308 and barometer 1 310 under the Mission Station node 302 and barometer 2 316 and temperature 3 320 under Twin Peaks Station node 306. Ocean Beach Station 304 as attributes including a time series named Temperature 2 312 but has no barometer sensor and thus no corresponding node 202. Therefore the time series under Ocean Beach Station 304 are not included in the matches 224.

Figure 3E:
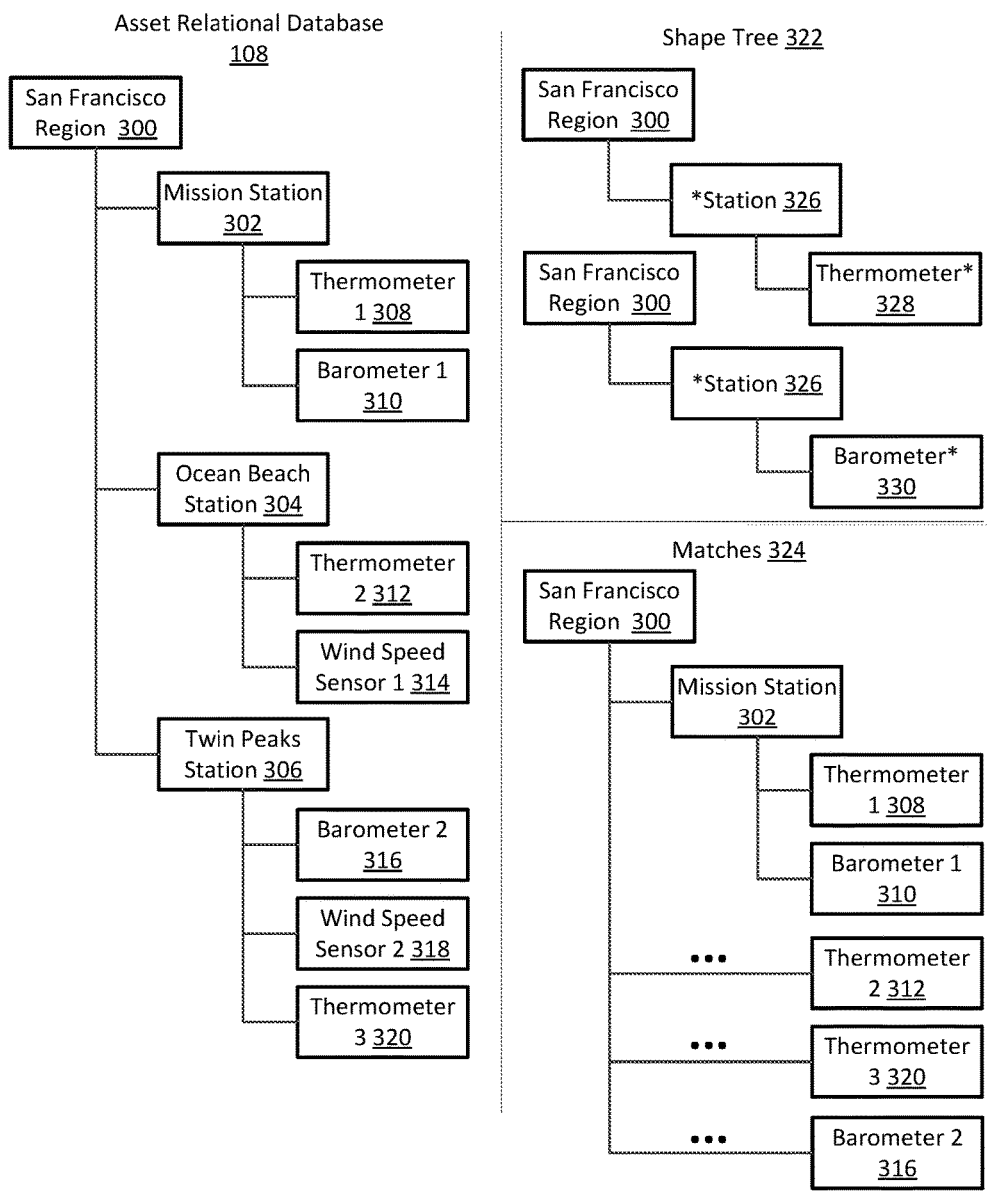

FIG. 3E illustrates a fourth possible shape tree 322 that may be specified by the user. In this example, the user has created two shape trees 322 with which to find a match 324. The data search module 116 searches for both shape trees in the asset relational database 108 and list results found using either tree. In this case, the two trees 322 indicate a search for any nodes ending in "Station" with an attribute of either a "Thermometer" or a "Barometer." The data search module 116 returns matches 324, which are all "Thermometer" and "Barometer" links to time series data 206 in the asset relational database 108.

Referring back to FIG. 1, once the data search module 116 locates matching branches of the asset relational database 108 using a provided shape tree, the data search module 116 returns a set of links to the time series database 206 corresponding to the shape tree matches 324. The data search module 116 uses the links to query the database for the associated time series data 200. Once the time series data has been retrieved from the time series database 106 it can be displayed and edited using the user interface module 114.

After the retrieved data is displayed to the user, the user interface module 114 receives input from the user specifying the time frame and format of the data for export. In order to specify a time frame for data export, the user follows a similar process as when they created the shape tree for retrieving the data from the time series database but, instead of using assets from the asset relational database 108, the user selects events from the event relational database 110 and this selection is received by the user interface module 114. Each event frame 214 selected by the user may be applied to a particular asset node 202 organizing the time series data. For example, if a user of a weather data collection system created an event for a storm that hit San Francisco but not San Jose the user would apply the event to only assets 202 under the San Francisco Region node 300. If the user wished to compare temperature, pressure and wind speed readings for a similar storm that impacted the San Jose Region at a different time, the user could set up an event for that storm and apply it to assets 202 in the San Jose Region node (not pictured in FIG. 3A).

In addition to providing an event frame for the retrieved time series data, the user interface module 114 may receive input from the user indicating other filters to the time series data. Some filters include numeric, string, digital, and null value filters. The functions of these filter options are explained in greater detail with reference to FIG. 5B.

After the user interface module 114 receives input from the user of the event frame and other filters to be applied to the data, the data reporting module 118 filters the retrieved time series data groups 200 according to the received user input. This may include limiting the data to within the selected event frames, removing data over or under certain numerical values, and removing null values from the data. Additionally, the data reporting module 118 may change the sampling rate of the data by interpolating and normalizing the data according to user input.

The interfaces provided by the user interface module 114 for data filtering and transformation are further described in FIGS. 5A-5D.

Once the desired transformations have been applied to the retrieved time series data groups 200 the data reporting module 118 may generate a data report. The data report can be output to a particular source (e.g. to disk, to a display) and in a particular format according to input from the user including in any common row table format or in a XML or JSON format. In some embodiments, the data reporting module 118 may update and report a set of data at a particular interval creating a continuous data feed. The data reporting module 118 may normalize the sampling rates and times across data in the same report to allow the user to compare the data more easily. The data reporting module 118 may request input from the user pertaining to the reported sampling rate and time offset.

The data report may also comprise a live data feed for use by third party applications. Data in the live data feed may be reported in a variety of ways including first in first out reporting (FIFO), merge reporting, event time reporting, and summary reporting.

FIFO reporting streams data as it is received by the data collection system 104. This for example would leave interpolating and normalization of data points to the third party application by providing a raw stream of time-stamped data as soon as it is collected by the data collection system 104.

Merge reporting allows the user to configure a set of multiple time series data groups 200 so that they are reported together. In this case, the data collection system 104 does not report data from any of the merged time series data until it has received at least one data point from each group 200. Merged time series data can be further configured to allow for more complex behavior including waiting for a particular number of data points from one of the data groups 200 for every data point of another data group 200. For example, three time series data groups 200 could be merged such that the data reporting module 118 will only report the data points when one data point from the first two data groups has been received and three data points have been received from the third data group 200. In this example, the user may specify that an average or other calculation be made with the three data points for the third data group 200.

Event time reporting allows the user to specify that the timestamps in a live reporting feed reflect the time elapsed since the beginning of the event as opposed to a global time stamp.

Summary reporting allows the user to select summary statistics, for example a running average, average of the last 5 data points, or any other calculable statistic to report on a regular interval.

Figure 4A:
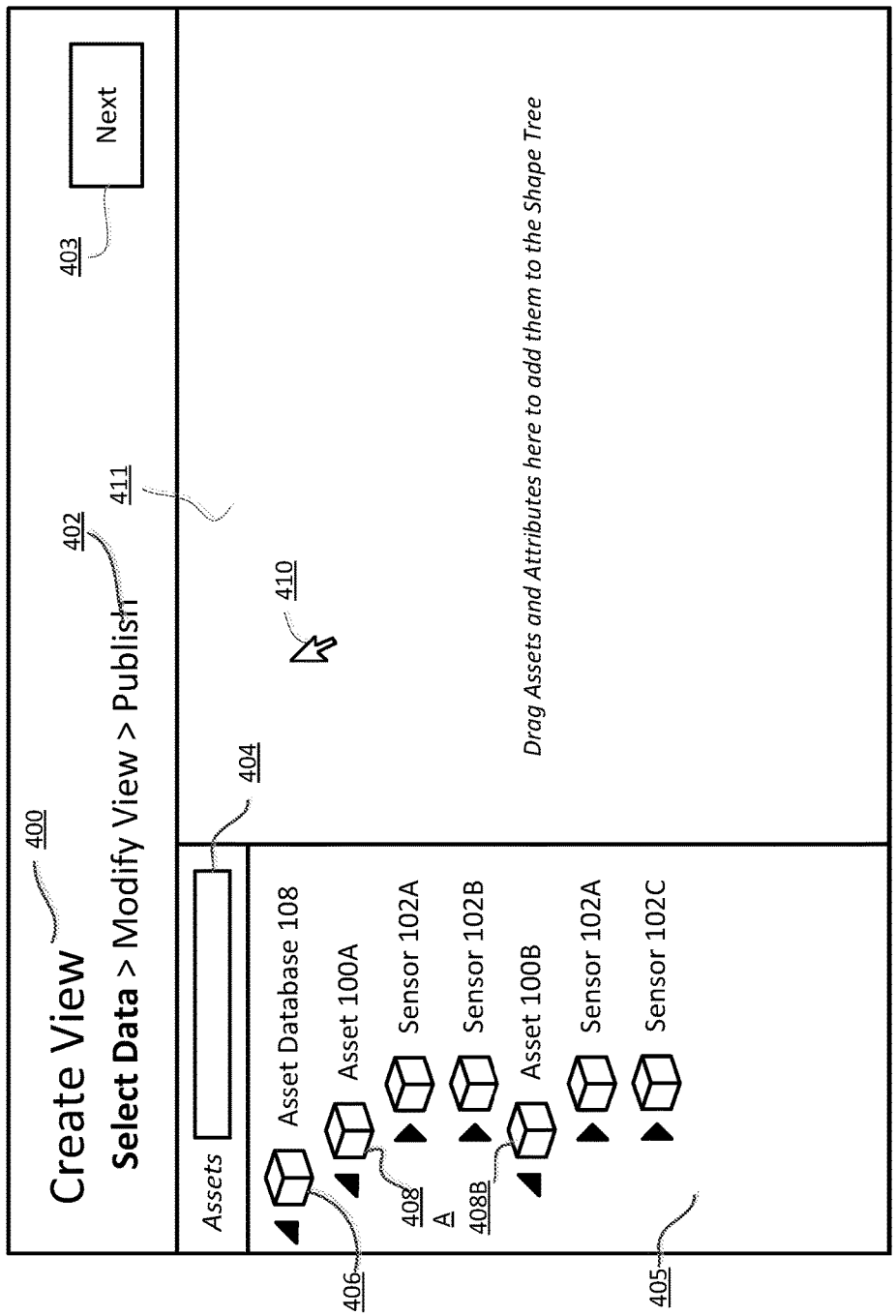

FIGS. 4A-4J illustrate a series of user interfaces used to generate a query for the databases in accordance with one embodiment. Each user interface is a different step in the process of creating and using a query. FIG. 4A illustrates a user interface for creating a shape tree. The interface includes a step label 400, a progress indicator 402, a next step button 403, an asset search bar 404, an asset search results region 405, asset database icon 406, asset icons 408A and 408B, mouse pointer 410, and shape tree region 411.

The step label 400 is a label the current step in the process of retrieving data from the time series database 106. The progress indicator 402 provides context for the user navigating the interface and gives the user an idea of how many steps remain in the process. The next step button 403 provides allows the user to navigate to the next step in the data integration providing an input on the next step button.

The asset search bar 404 allows the user to input text to locate particular assets 202 in the asset relational database 108 with which to create the desired shape tree. In addition to textual search for the names of particular assets 202, the asset search bar 404 may also be used to search for particular attributes of assets 202.

The asset search results region 405 is a region of the interface where the results of the users input to the asset search bar 404 are shown. In the current illustration, the user has not provided an input to the asset search bar 404 and so all of the assets in asset database 108 are visible in the asset search region 405. If a user entered any type of search term input the asset search bar 404, the asset search results region would display only the assets that are related to that search term.

The asset database icon 406 indicates a name of the asset relational database 108 that the asset search is being conducted in. Asset icons 408A and 408B indicate asset nodes 202 in the asset relational database. Shape tree region 411 is a region of the user interface designated for creating the shape tree.

FIG. 4A also shows a mouse pointer 410, which is controlled by the user in order to interact with the user interface.

Figure 4B:
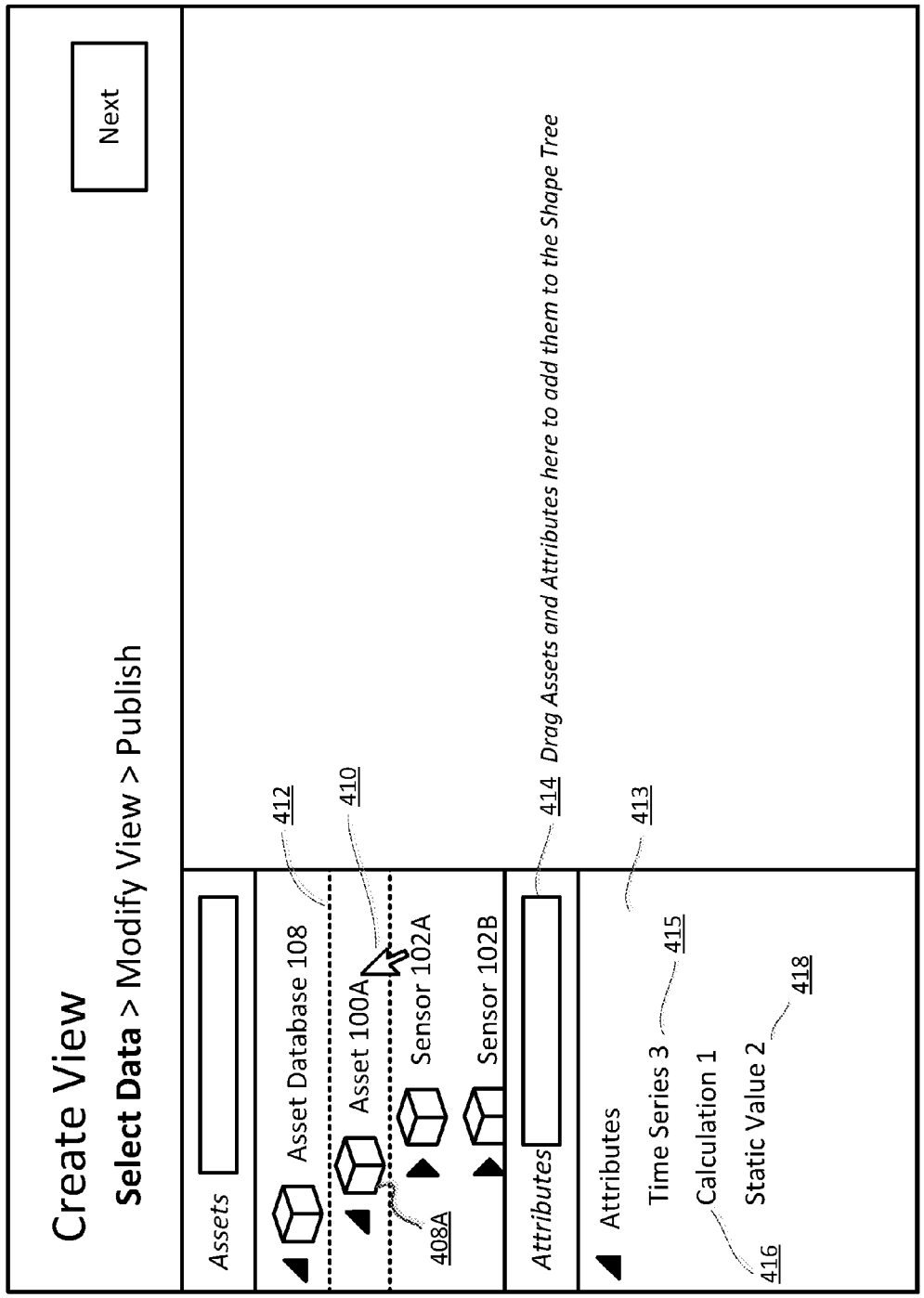

FIG. 4B illustrates the user interacting with an asset icon 408A in the asset search region 405 in accordance with one embodiment. The user clicks on asset icon 408A using mouse pointer 410. The asset icon 408A is highlighted 412 to indicate that it has been selected by the user. Because the asset icon 408A has been selected, the attributes region 413 displays the attributes 206 of asset 100A. The attributes region 413 is also accompanied by the attributes search bar 414, which functions similarly to the asset search bar 404 in that it searches for attributes of the selected asset 102. In this example, no search terms have been entered into the attribute search bar 414 so all attributes 204 of asset 100A are displayed in the attributes region 413. These include "Time Series 3" 415, "Calculation 1" 416, and "static value 2" 418. These attributes could have any user specified name, however the names have been kept generic for the purpose of this example.

Figure 4C:
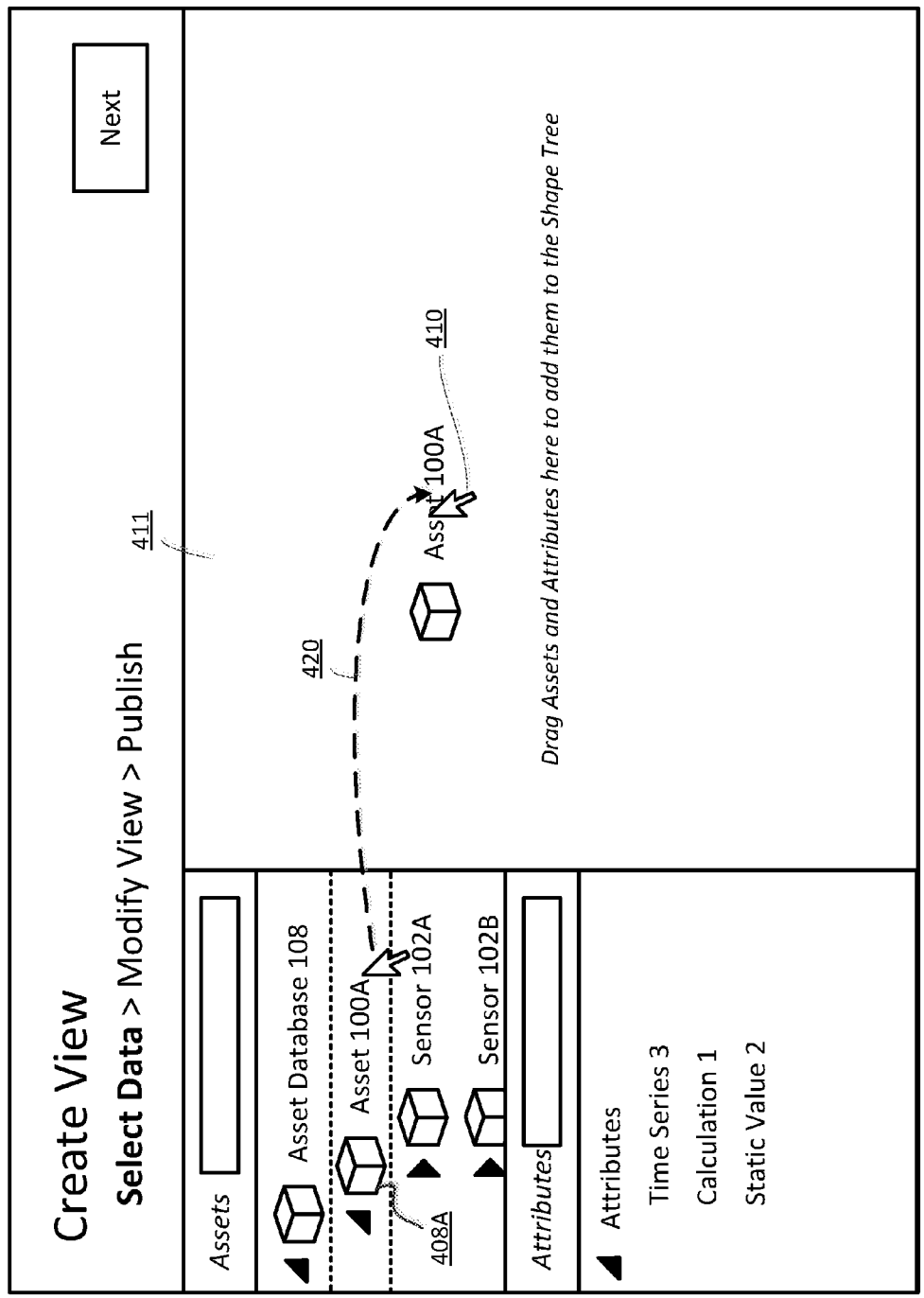

FIG. 4C illustrates the first step of creating shape tree in accordance with one embodiment. The user clicks and drags 420 asset icon 408A, using mouse pointer 410, into shape tree region 411. In other embodiments, an asset 202 may be added to a shape tree using a right click dropdown menu option as opposed to clicking and dragging as shown.

Figure 4D:
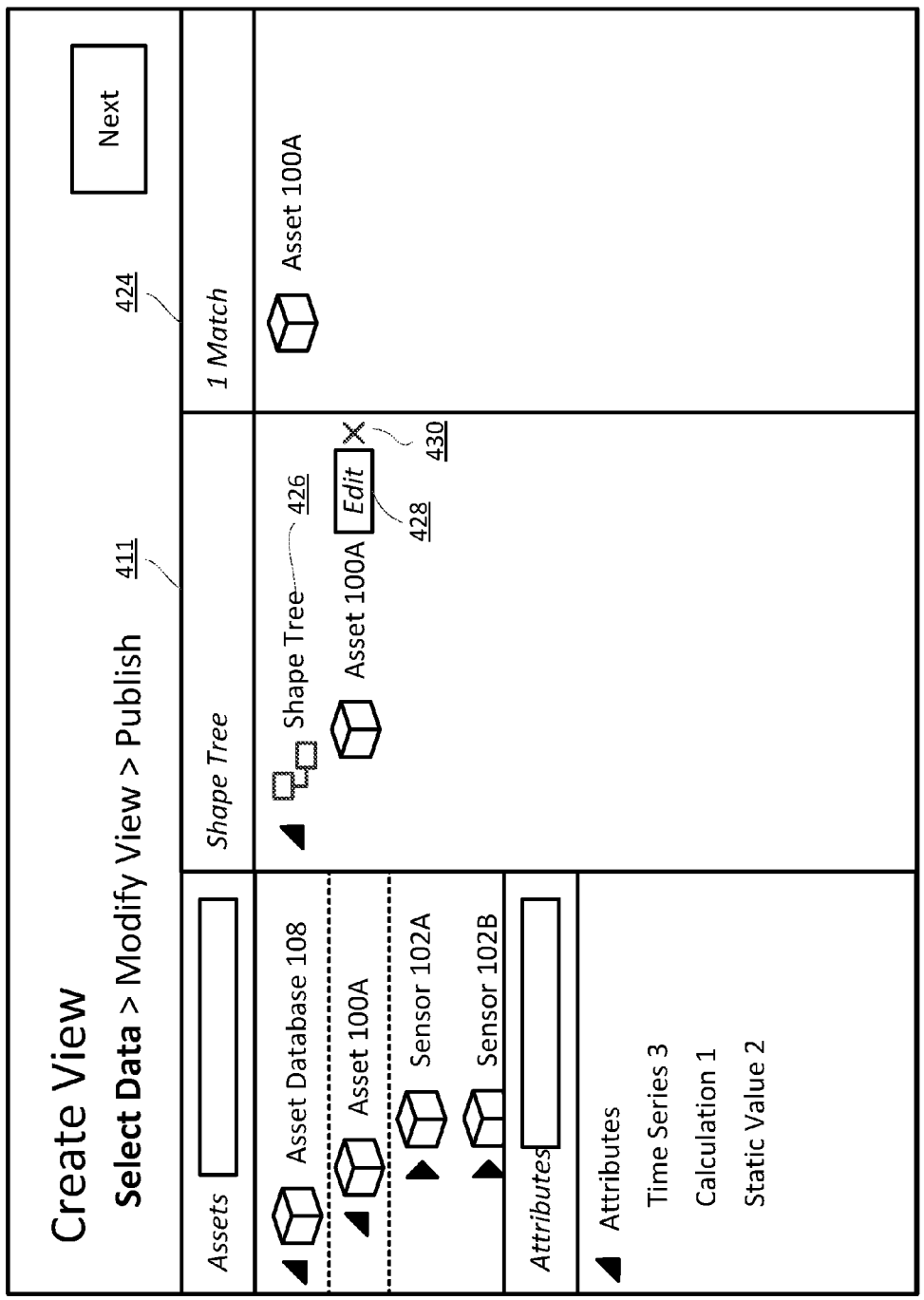

FIG. 4D shows the result of the clicking and dragging operation 420 from FIG. 4C in accordance with one embodiment. User interface module 114 adds match region 424 to the interface, and shape tree region 411 is populated with a shape tree icon 426, along with edit 428 and delete asset 430 buttons.

The match region 424 displays matches 324 determined by the data search module 116. In this case, there is only one asset 202 matching the current shape tree.

The shape tree icon 426 indicates the shape tree and the name of the shape tree (if the user decides to name the shape tree). In some embodiments, multiple search tree icons 426 may be present it the user decides to create multiple search trees in order to retrieve separate data in parallel.

The edit asset button 428 allows the user to edit the asset node in the shape tree in order to search for different tree structures in the asset relational database 108. The delete asset button 430 removes the asset node 202 from the shape tree 426 and from the search conducted by the data search module 116.

Figure 4E:
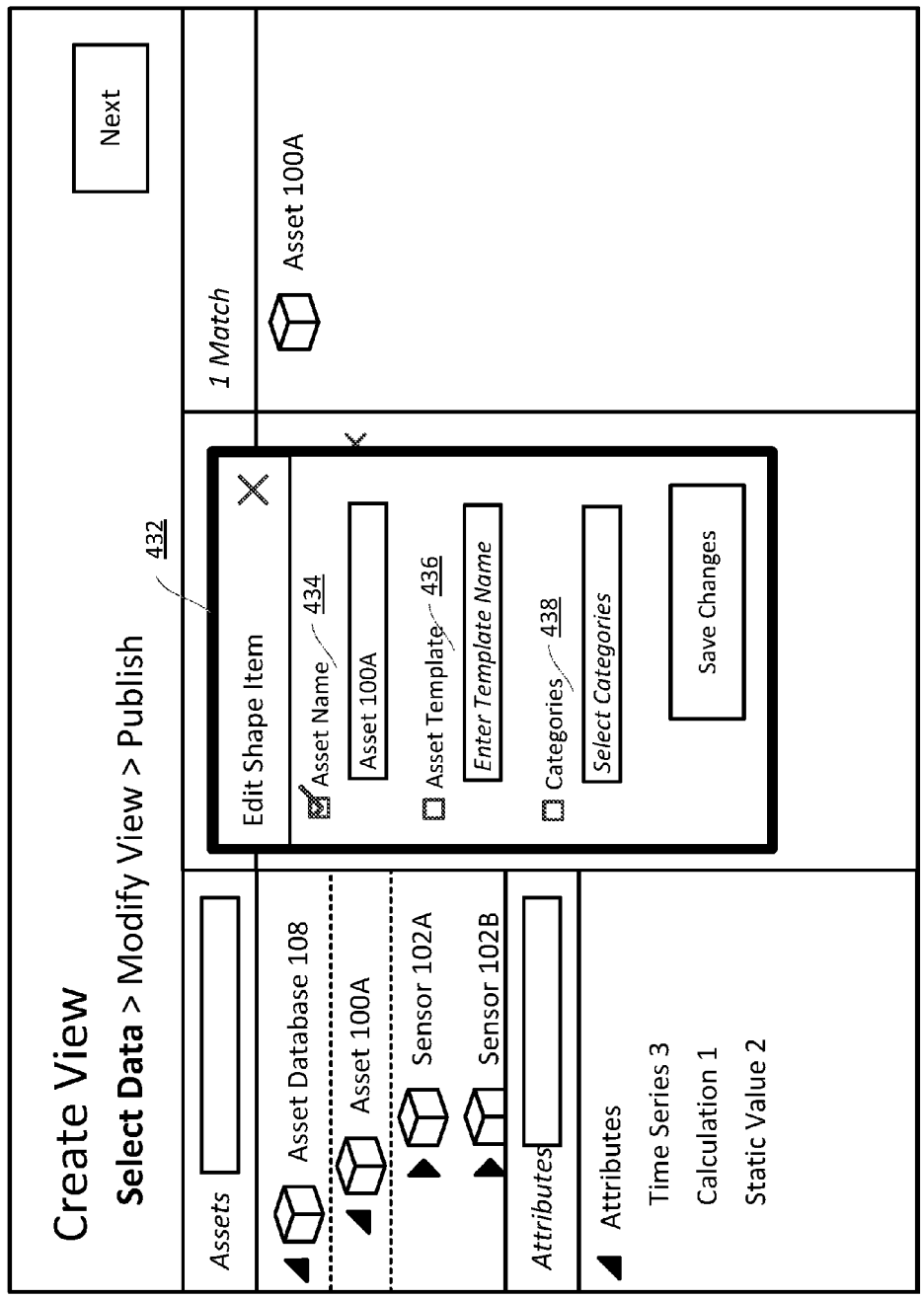

FIG. 4E illustrates the result of a user interacting with the edit asset button 428 in accordance with on embodiment. In this example, a pop up menu 432 is displayed in response to the user interacting with the edit asset button 428. The pop up menu 432 provides options for the user to change the asset node in the shape tree by entering an asset name in the asset name field 434, an asset template in the asset template field 436, or an asset category in the asset category field 438. In some embodiments, a user may enter text in each field and the search algorithm will find the intersection of the search results of the name 434, template 436, and category 438 fields.

Figure 4F:
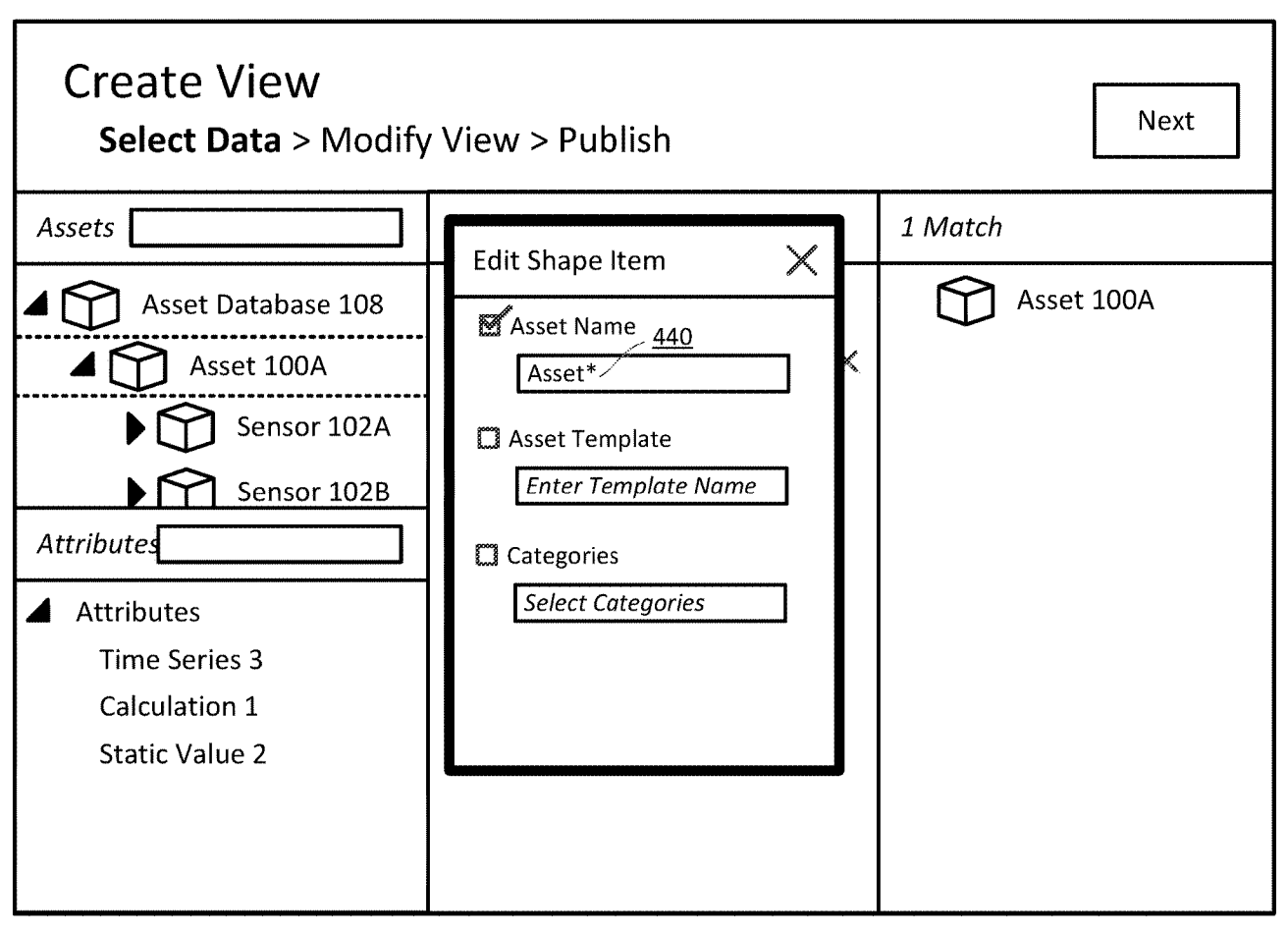

FIG. 4F illustrates the user editing 440 the asset name field using the wildcard symbol "*". In the illustrated embodiment the wildcard symbol indicates that the name may be any asset name that starts with "Asset." The "*" indicates that any ending is an acceptable match. In some embodiments, other symbols can be used to create a flexible search node. Additionally, typical search syntax can be used in any of the fields in the pop up menu 432 including words like "and" and "or" that specify logical intersections or unions respectively. These logical functions may be represented by symbols like "&" or "|" depending on the embodiment.

Figure 4G:
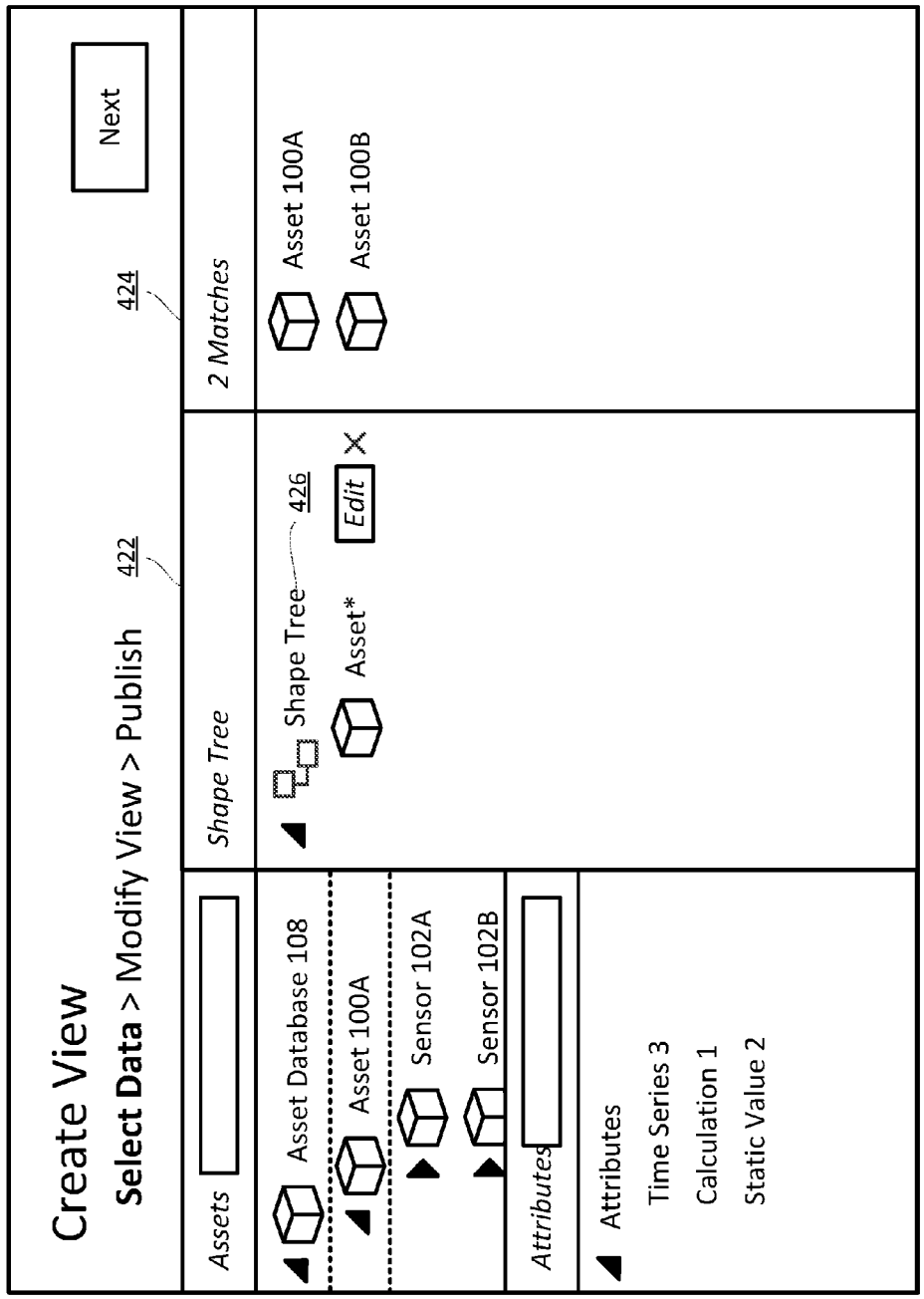

FIG. 4G illustrates the results of a user accepting the changes made in the asset editing pop up menu 432 in accordance with one embodiment. The shape tree 426 now shows a node labelled "Asset*" which indicates that the node is flexible search and as such the matches region 424 shows two matching asset objects assets 100A and 100B.

Figure 4H:
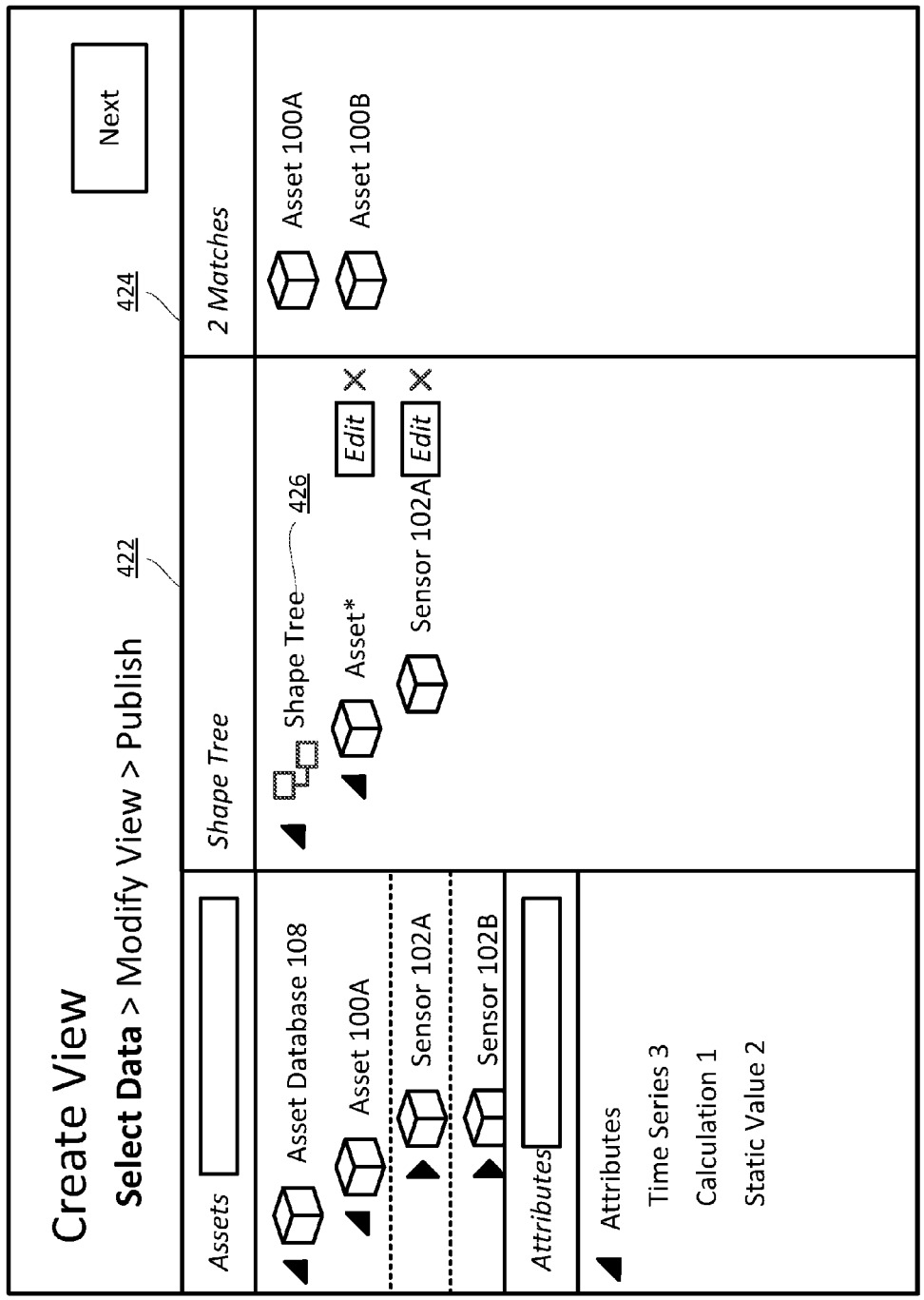

FIG. 4H illustrates an expansion of the shape tree 426 by adding an additional asset node "Sensor 102A" in accordance with one embodiment. In this example, the number of matches in the matches region 424 does not change because both assets 100A and 100B have subordinate asset nodes labeled "Sensor 102A" resulting in two matches. As illustrated in FIG. 4H the shape tree may be displayed such that superior nodes are located on the left most edge of the shape tree region and subordinate nodes are indented according to their level in the tree hierarchy. Other visual representations of the search tree are also possible as long as they clearly display the hierarchy of each node and it's superior and subordinate nodes. Interacting with the arrows next to the node icons hides or displays subordinate nodes in the shape tree.

Figure 4I:
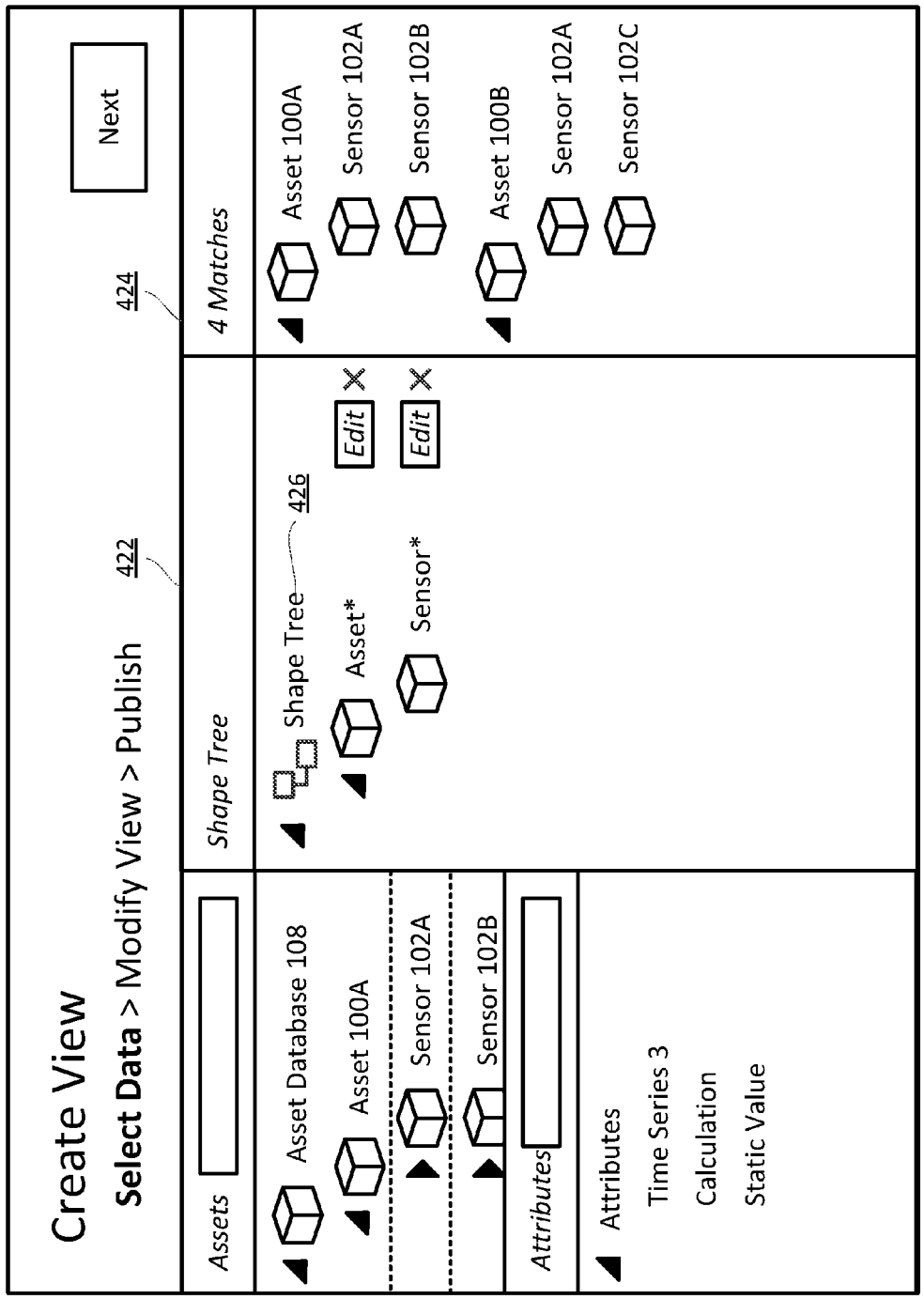

FIG. 4I illustrates the result of the user using the same pop up menu 432 to change the "Sensor 102A" node to a flexible search node in accordance with one embodiment. This change causes four matches to be displayed in the matches region 424, which include all of the sensors subordinate to assets 100A and 100B.

Figure 4J:
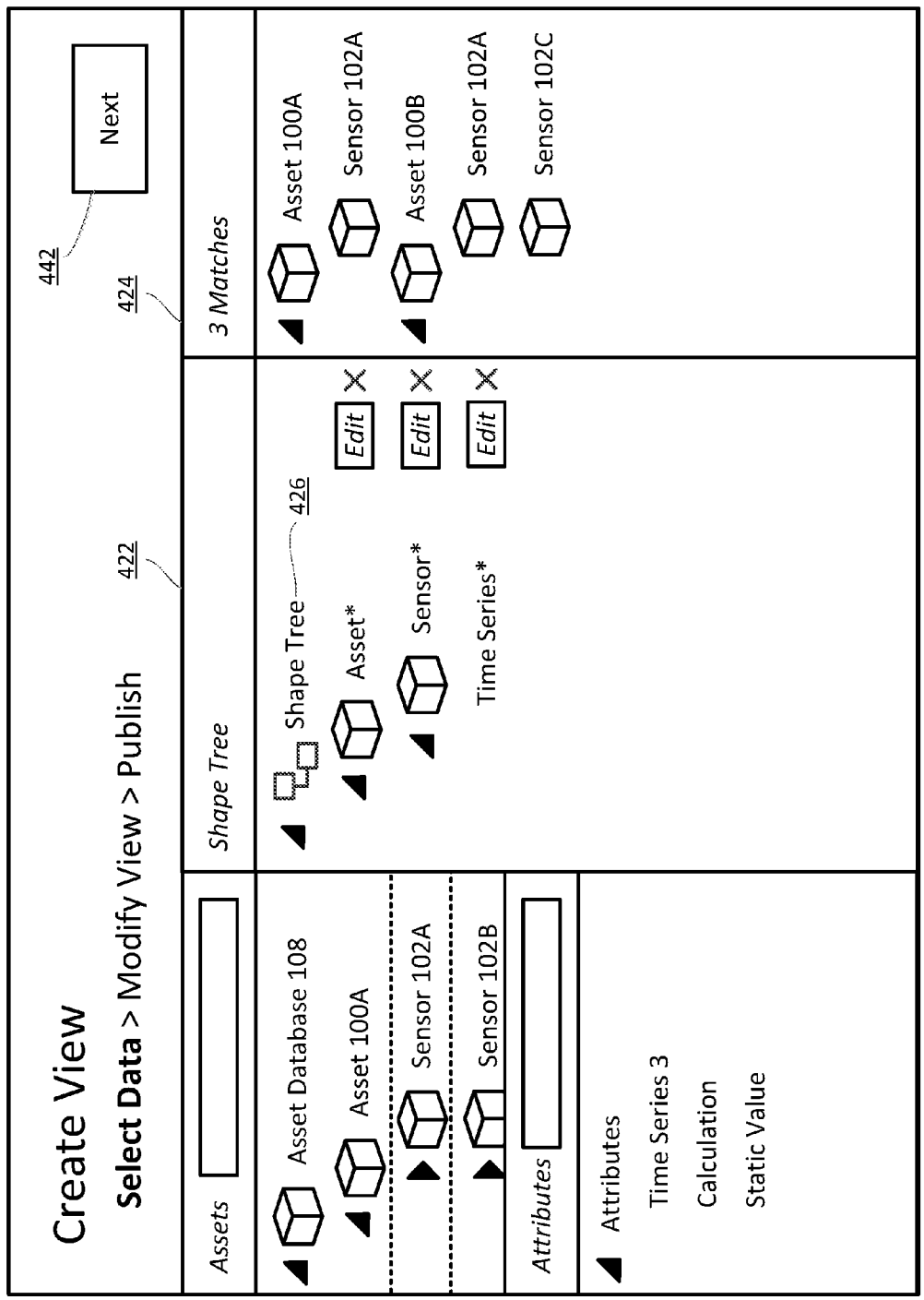

FIG. 4J illustrates the addition of an attribute to the shape tree 426 in accordance with one embodiment. In this example, the user has added a flexible search attribute to the shape tree 426. Because, in this example, Sensor 100B does not have a time series attribute it is not excluded from the results, leaving three matches remaining in the matches region 424.

FIGS. 5A-5D illustrate steps of a user interface for filtering and formatting output data in accordance with one embodiment. Once the user is satisfied with the matches in the matches region 424 of the user interface they may click on the next step button 403, which initiates the data publishing interface. In this embodiment, the data publishing interface has an add column button 500, and edit timeframe button 502, and an edit row filters button 504. The interface also includes a publish button 505 which publishes the formatted and filtered data to a source of the user's choosing. Lastly, the interface includes a spreadsheet 506 displaying the data retrieved by the data search module 116.

The add columns button 500 allows the user to choose the columns from the retrieved data. For example, in the illustrated example, only one time series is shown in the column headings. If other time series had available data at the same time a column for each time series could be added to the spreadsheet.

The edit time frame button 502 allows the user to set outside limits on the time frame of the data without using events 214 from the event relational database 110. For example, the user might exclude all data before a particular date or after a particular date or restrict all data to within a particular time interval.

The edit row filters button 504 allows the user to apply a number of types of row filters to the data, giving the user greater control over which data are published or exported. The types of row filters that may be applied are discussed in further detail with reference to FIG. 5B.

FIG. 5B illustrates a pop up menu for row filters that may be displayed in response to a user interacting with the row filters button 504. Possible row filter options include a numeric filter 508, a string filter 510, a digital filter 512, and event frame filter 514, and a null value filter 516.

A numeric filter 508 applies a numeric inequality or other function to the data and disregards data that does not satisfy that inequality. For example, a numerical filter could be applied to a set of temperature data excluding all data points with a temperature less than 0 degrees Celsius.

A string filter 510 filters rows that have been labeled with a particular string, or series of characters.

A digital filter 512 filters rows to those rows that include certain digital values.

An event frame filter 514 applies an event interval 216 from an event frame 214 in the event relational database 110 and applies it to the retrieve time series data. The process of applying an event to the retrieved time series data is explain in further detail with reference to FIGS. 5C-5E.

A null value filter 516 removes all rows containing null values from the retrieved time series data. In some embodiments, when the user creates a null value filter the user can choose to remove the null values or have them replaced with a chosen value according to further user input.

Figure 5A:
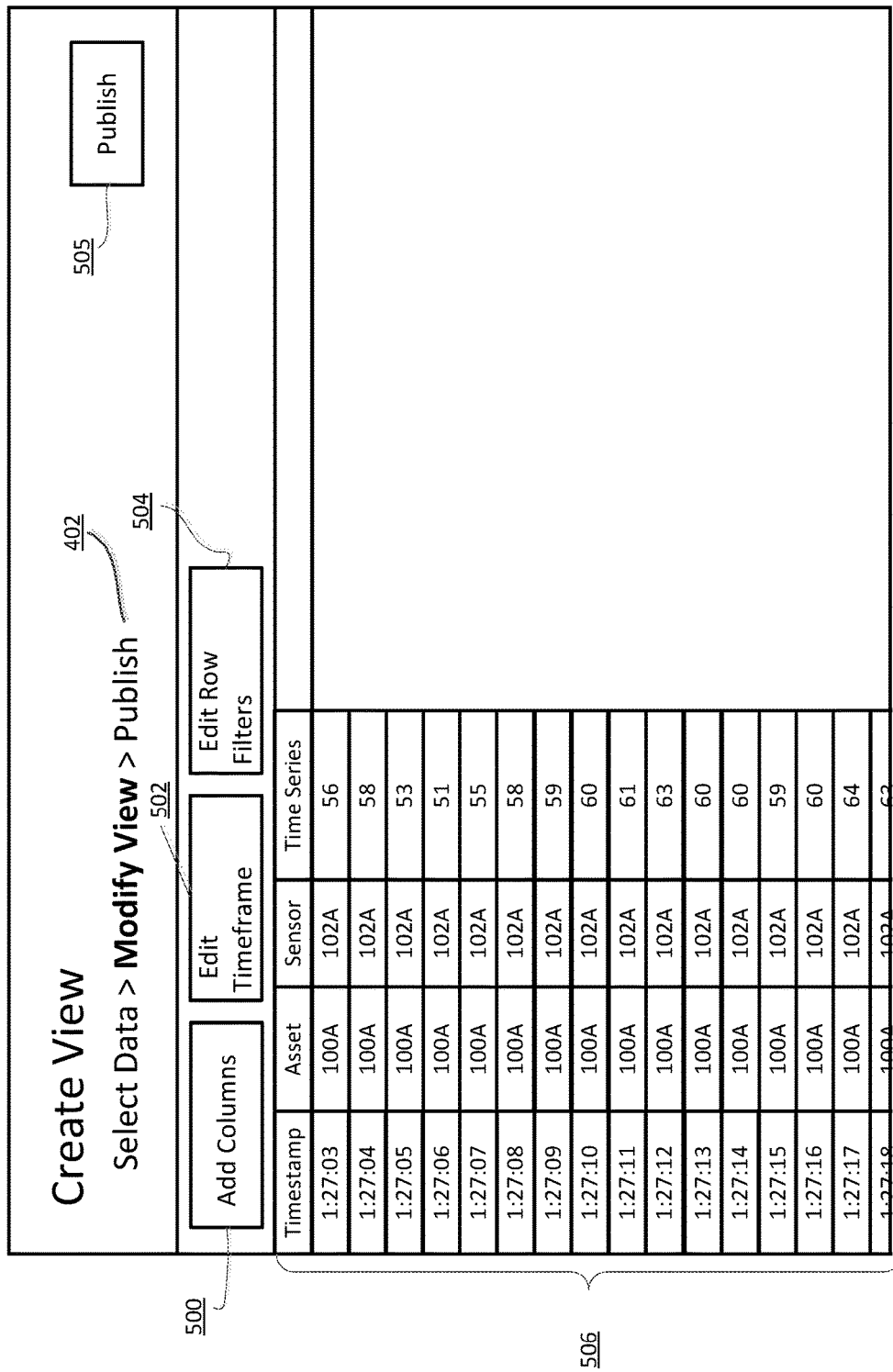
Figure 5C:
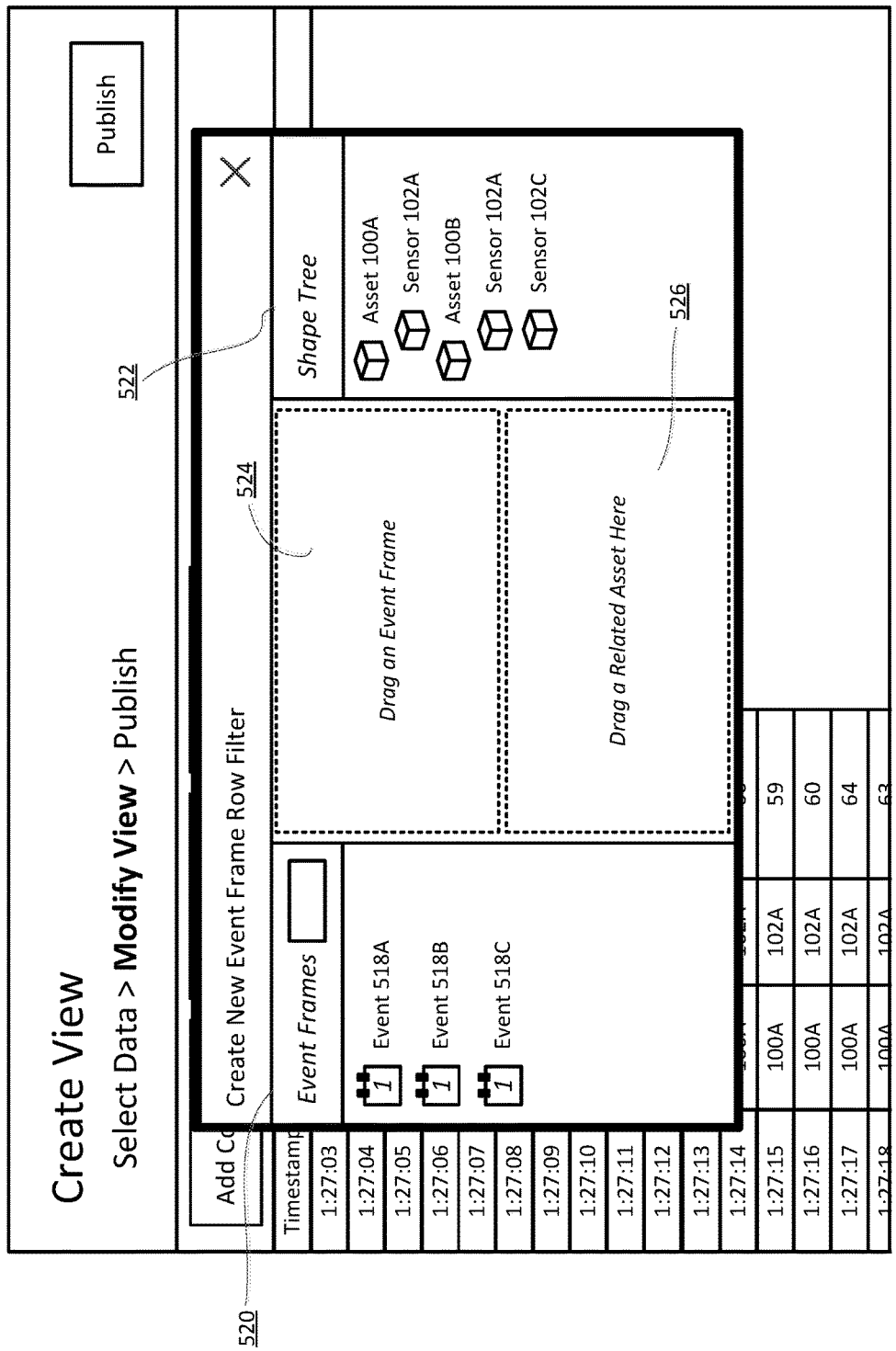

FIG. 5C illustrates the result of the user choosing an event frame filter 514 in the pop up menu from FIG. 5B in accordance with one embodiment. In response to the user choosing the event frame filter button 514 a new pop up interface is displayed which allows the user to select event frames 214 to use to filter the retrieved time series data. On one left side of the interface, available events 214 from the event relational database 110 are displayed in the event frame region 520 (in this example the events are not organized in a hierarchical structure but they may be depending on the embodiment). In addition to displaying the events from the event relational database 110 the event frame region 520 has an event frame search bar which may be used to search for desired events. One the opposite side of the pop up interface the shape tree 422 that resulted in the retrieved time series data 506 is displayed. In the middle of the pop up interface there are two regions an event application region 524 for events 214 to be applied to the data, and a related asset region 526 for the assets to which the events should be applied.

Figure 5D:
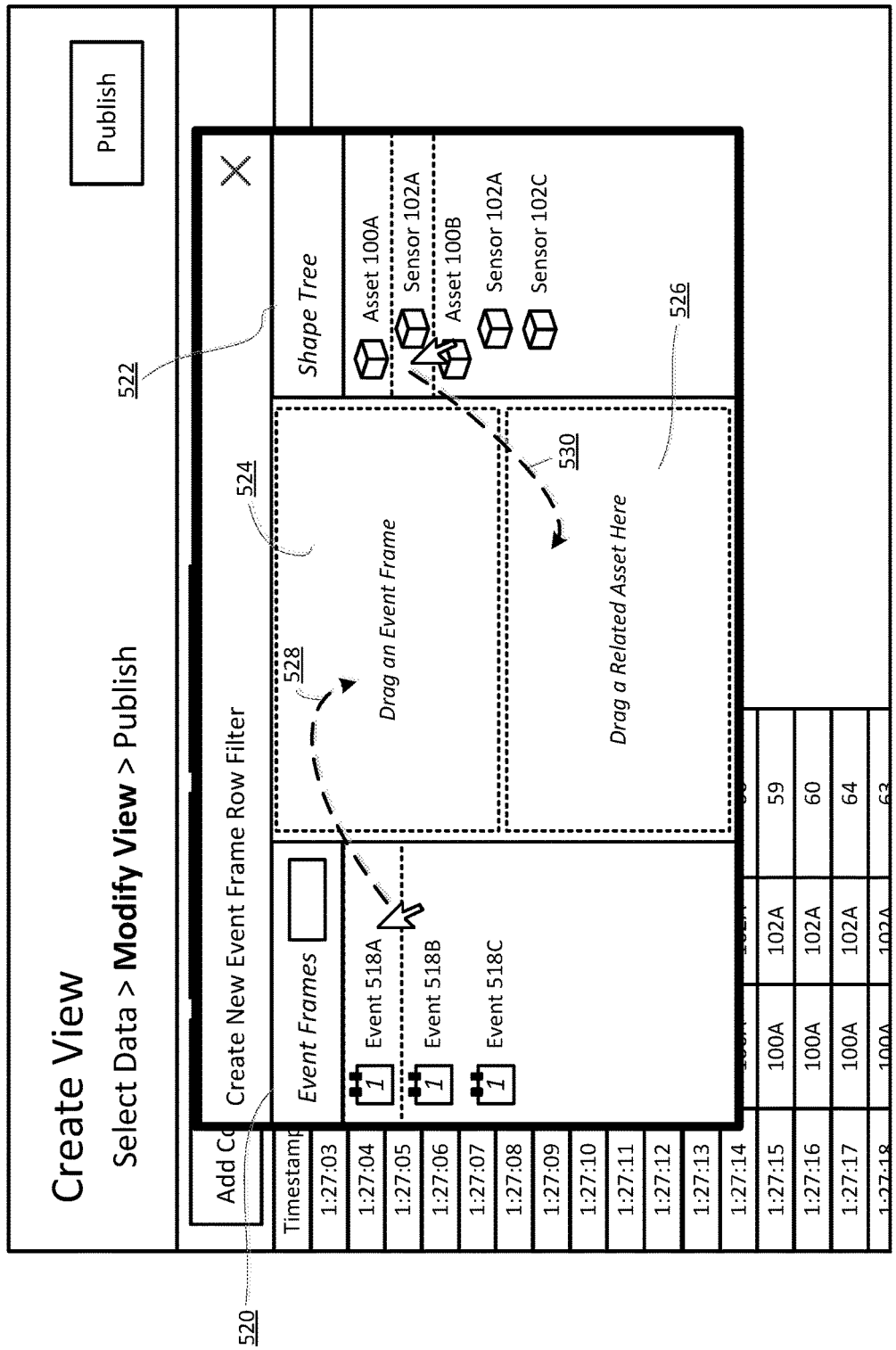

FIG. 5D illustrates the process of applying an event (Event 518A in this example) to data from a particular asset (Sensor 102A in this example) in accordance with one embodiment. In this example, the user selects event 518A and drags 528 it to the event application region 524. In some embodiments, once the user has selected an event 214, the asset nodes in the shape tree will be filtered such that only assets listed as associated assets 218 are available for selection. This may narrow the number of assets 202 and may make it easier for the user to choose an asset that makes sense given the context of the event 214. Once an event 214 has been selected from the event region 520, use then selects and drags 530 a related asset from the asset region 522. Once the user confirms the selection, the data reporting module 118 will filter the retrieved time series data from the selected asset nodes such that any data points in the time series 200 that have a time stamp outside the event interval 216 of the selected event 214 will be removed.

After the data reporting module 118 applies the desired filters, the user may simply click on the publish button 505 to move to the last step in the data integration process. During this process, the data reporting module 118 receives input from the user indicating the format that the user would like to export the data in. The data may be exported in a variety of spreadsheet and database compatible formats including excel spreadsheet, tab comma or space delimited text, data interchange format, as an XML, or JSON file, or any other suitable or customizable data format. In some embodiments the user may also choose to create a reporting schedule. If so, the data integration system 112 will repeat the chosen data retrieving periodically and report in the desired format. Additionally, in some embodiments, the data reporting module 118 may also allow the user to report data from particular assets as a live stream with a variety of streaming options discussed above including FIFO streaming, merge streaming, event time streaming, and summary streaming.

In an embodiment where the event relational database 110 is configured in a hierarchical tree structure, the UI flow of choosing a shape tree and finding a match in the asset relational database as illustrated in FIGS. 4A-4J followed by the UI flow of choosing an event frame as illustrated in FIGS. 5A-5D may be reversed. In this case, the user would first choose and event from the event relational database 110 or find an event using an event hierarchical search template. Then the user would choose an asset frame for the time series in the events such that only data associated with certain assets is retrieved. This process flow would be more appropriate for event oriented industrial data collection systems.

Figure 6:
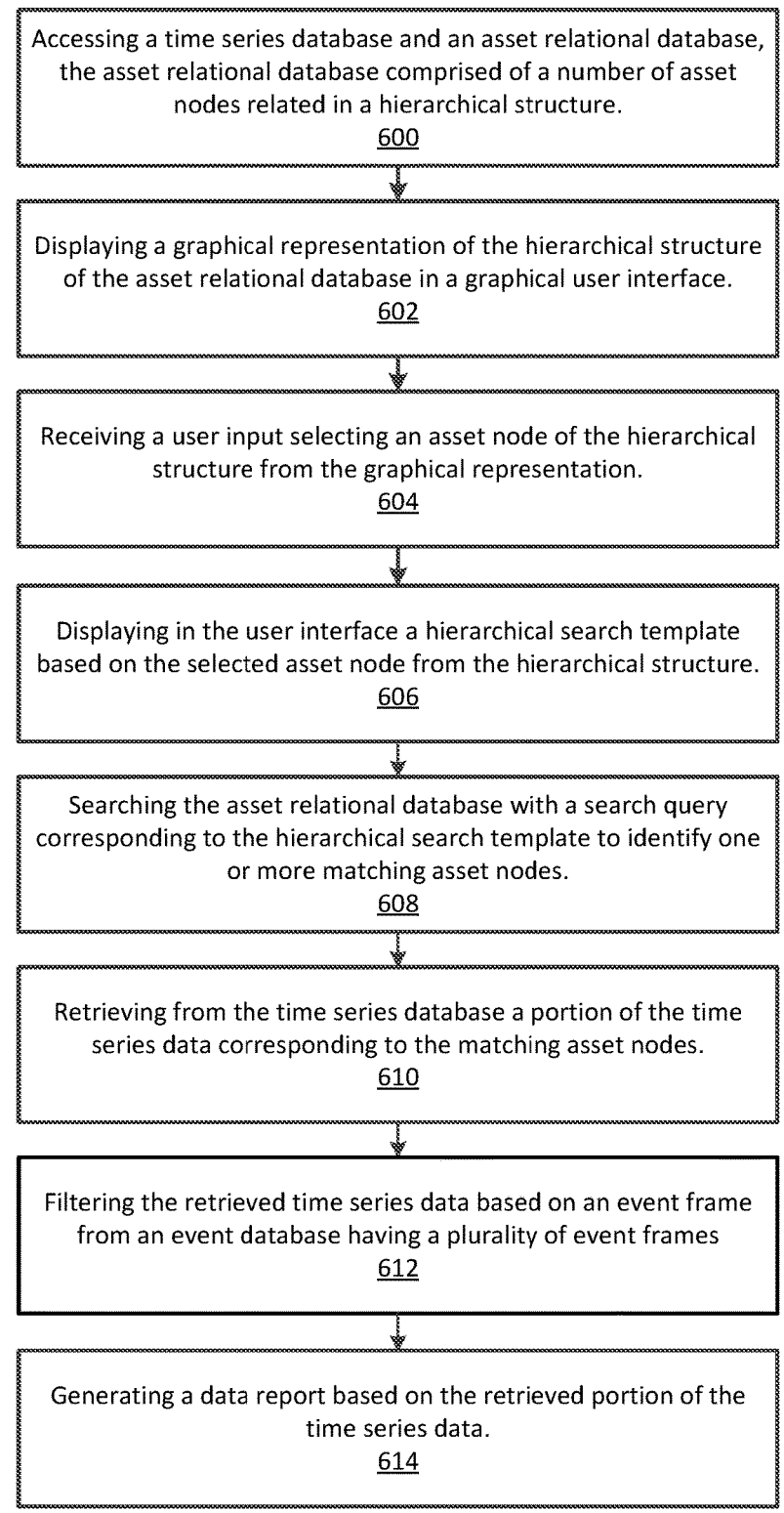
FIG. 6 is a flowchart illustrating the process of integrating multi-context time series data in accordance with one embodiment.

FIG. 6 is a flowchart illustrating the process of integrating multi-context time series data in accordance with one embodiment. First data integration system 112 accesses 600 time series database 106 and asset relational database 108. The asset relational database is comprised of a plurality of asset nodes 202 related in a hierarchical structure. In some embodiments, the hierarchical structure is the tree structure above described.

The data integration system 112 displays 602 a graphical representation of the hierarchical structure of the asset nodes 202 in the asset relational database 108 in a graphical user interface. For example, the graphical representation of the hierarchical structure can be the graphical elements displayed in the asset search results region 405 of FIG. 4A. The data integration system 112 receives 604 user input selecting an asset node 202 of the hierarchical structure from the graphical representation in the graphical user interface.

The data integration system 112 then displays 606 in the graphical user interface a hierarchical search template (also referred to as a "shape tree") based on the selected asset node from the hierarchical structure. For example, the shape tree can be the graphical elements displayed in the shape tree region 411 of FIG. 4D. In some embodiments the hierarchical search template is comprised of a plurality of selected asset nodes. Additionally, in response to a user input, the asset nodes may be modified such that they are flexible or wildcard nodes that can be used in a search for asset matches. This was previously described by reference to FIG. 4E through 4G.

The data integration system 112 then searches 608 the asset relational database 108 with a search query corresponding to the hierarchical search template (i.e. shape tree) to identify one or more matching asset nodes 202. The matching asset nodes 202 can be displayed as shown in FIG. 4H-4J. In some embodiments this search query is an XML, search query formulated from the shape tree 426.

The data integration system 112 retrieves 610 from the time series database 106 a portion of the time series data 200 corresponding to the matching asset nodes. In some embodiments, the data integration system 112 filters 612 the retrieved time series data 200 based on an event frame 214 from an event relational database 110. Each event frame in the event relational database 110 defines at least an event interval 216 and is associated with an asset node 202 of the matching asset nodes 202. User interfaces for filtering were previously described by reference to FIG. 5A-5D.

The data integration system 112 generates 614 a data report based on the retrieved portion of the time series data 200, which may be the filtered data. The data integration system may then export the data report to a location received from the user, at a time received from the user, in a format received from the user. The report can also be displayed in a user interface.

As a result of embodiments described herein, data from the databases 106, 108, and 110 can be quickly searched and transformed from raw data into a presentable data report. Further, the embodiments described herein also solve the technical problem of integrating data from multiple databases.

Figure 7:
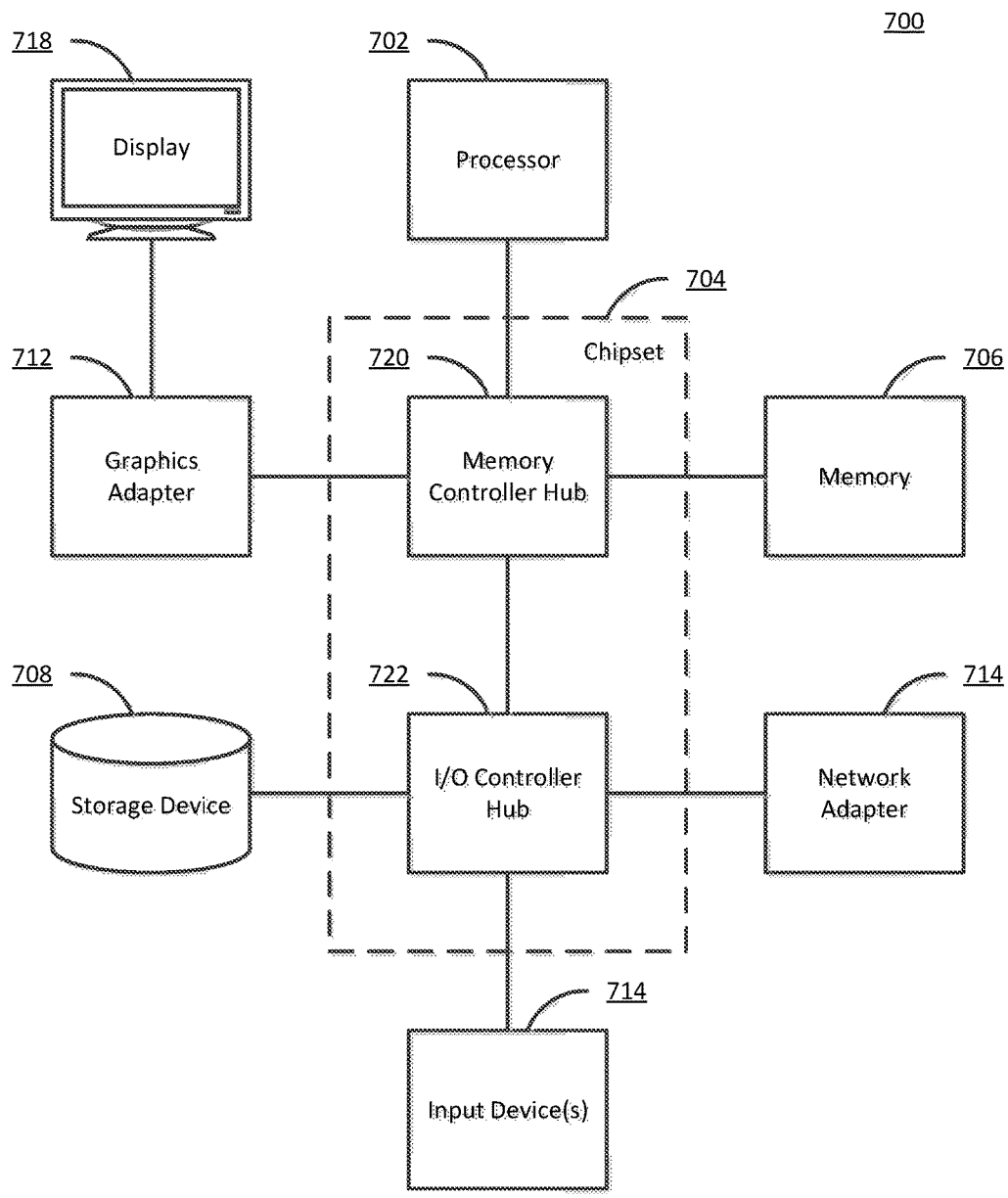
FIG. 7 is a high-level block diagram of the components of a computing system for use as the server or mobile device in accordance with one embodiment.

FIG. 7 is a high-level block diagram of the components of a computing system 700 for use as the data collection system 104 or data integration system 112, according to one embodiment. The computing system 700 includes at least one processor 702 coupled to a chipset 704. Also coupled to the chipset 704 are a memory 706, a storage device 708, a graphics adapter 712, input device(s) 714, and a network adapter 716. A display 718 is coupled to the graphics adapter 712. In one embodiment, the functionality of the chipset 704 is provided by a memory controller hub 720 and an input/output (I/O) controller hub 722. In another embodiment, the memory 706 is coupled directly to the processor 702 instead of the chipset 704.

The processor 702 is an electronic device capable of executing computer-readable instructions held in the memory 706. In addition to holding computer-readable instructions, the memory 706 also holds data accessed by the processor 702. The storage device 708 is a non-transitory computer-readable storage medium that also holds computer readable instructions and data. For example, the storage device 708 may be embodied as a solid-state memory device, a hard drive, compact disk read-only memory (CD-ROM), a digital versatile disc (DVD), or a BLU-RAY disc (BD). The input device(s) 614 may include a pointing device (e.g., a mouse or track ball), a keyboard, a touch-sensitive surface, a camera, a microphone, sensors (e.g., accelerometers), or any other devices typically used to input data into the computer 700. The graphics adapter 712 displays images and other information on the display 718. In some embodiments, the display 718 and an input device 714 are integrated into a single component (e.g., a touchscreen that includes a display and a touch-sensitive surface). The network adapter 716 couples the computing device 700 to a network, such as the network 102.

A computer 700 can have additional, different, and/or other components than those shown in FIG. 7. In addition, the computer 700 can lack certain illustrated components. In one embodiment, a computer 700 acting as a server may lack input device(s) 714, a graphics adapter 712, and/or a display 718. Moreover, the storage device 708 can be local and/or remote from the computer 700. For example, the storage device 708 can be embodied within a storage area network (SAN) or as a cloud storage service.

The computer 700 is adapted to execute computer program modules for providing functionality described herein. As used herein, the term "module" refers to computer program logic utilized to provide the specified functionality. Thus, a module can be implemented in hardware, firmware, and/or software. In one embodiment, computer program modules are stored on the storage device 708, loaded into the memory 706, and executed by the processor 702.

Some portions of the above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the disclosure. This description should be read to include one or at least one and the singular also includes the plural unless it is obvious that it is meant otherwise.

Upon reading this disclosure, those of skill in the art will appreciate still additional alternative structural and functional designs for a system and a process for generating messaging directories and messaging members of those directories. Thus, while particular embodiments and applications have been illustrated and described, it is to be understood that the described subject matter is not limited to the precise construction and components disclosed herein and that various modifications, changes and variations which will be apparent to those skilled in the art may be made in the arrangement, operation and details of the method and apparatus disclosed herein.

The invention claimed is:

1. A computer implemented method for data integration, the method comprising:
   accessing a time series database that comprises times series data from a plurality of physical assets and accessing an asset relationship database comprising a plurality of asset nodes related in a hierarchical structure, each asset node corresponding to a respective physical asset;
   displaying a graphical representation of the hierarchical structure of the asset relational database in a graphical user interface;
   receiving a user input selecting an asset node of the hierarchical structure from the graphical representation;
   displaying, in the graphical user interface, a hierarchical search template based on the selected asset node of the hierarchical structure, the hierarchical search template having a hierarchical tree shape comprised of a plurality of superior and subordinate levels;
   searching the asset relational database with a search query corresponding to the hierarchical search template to identify one or more matching asset nodes, the searching comprising locating branches of the hierarchical structure of the asset relational database that match the hierarchical tree structure specified in the hierarchical search template;
   retrieving from the time series database a portion of the time series data corresponding to the matching asset nodes; and
   generating a data report based on the retrieved portion of the time series data.

2. The method of claim 1, further comprising:
   displaying a plurality of attributes of the asset node in the user interface;
   receiving a user input selecting an attribute from the plurality of attributes; and
   adding the attribute to the hierarchical search template.

3. The method of claim 1, wherein retrieving the portion of the time series data corresponding to the matching asset nodes comprises retrieving a portion of the time series data corresponding to the matching asset nodes based on the attribute of the hierarchical search template.

4. The method of claim 3, wherein an attribute is a static value, a reference to the time series data, a calculation based on time series data or static values, or a reference to another asset.

5. The method of claim 1, further comprising:
   converting the selected asset node in the hierarchical search template into a flexible search node.

6. The method of claim 1, wherein the asset relationship database is searched with holistic twig pattern matching.

7. The method of claim 1, further comprising:
   accessing an event relational database having a plurality of event frames, each event frame associated with an asset node from the plurality of assets and a timeframe for an event;
   receiving a user input selecting an event frame from the plurality of event frames; and
   filtering the identified time series data based on the event frame, wherein the data report is generated based on the filtered time series data.

8. The method of claim 7, further comprising:
   displaying a graphical representation of the event relational database in a graphical user interface;
   receiving a user input selecting at least one event frame from the graphical representation of the event relational database;
   displaying, in the graphical user interface, a search template based on the selected at least one event frames;
   searching the event relational database with a search query corresponding to the search template to identify one or more matching event frames;
   retrieving from the time series database a portion of the time series data corresponding to the matching event frames;
   accessing the asset relational database;
   receiving a user input selecting at least one asset node from the plurality of asset nodes; and
   filtering the retrieved time series data based on the at least one asset node, wherein the data report is generated based on the filtered time series data;
   generating a data report based on the retrieved portion of the time series data.

9. The method of claim 1, wherein creating a data report comprises interpolating the retrieved time series data based on a selected sampling interval.

10. The method of claim 1, wherein creating a data report further comprises creating an xml script representing the report.

11. A non-transitory computer readable storage medium comprising instructions that when executed by a processor cause the processor to perform the steps of:
    accessing a time series database that comprises times series data from a plurality of physical assets and accessing an asset relationship database comprising a plurality of asset nodes related in a hierarchical structure, each asset node corresponding to a respective physical asset;
    displaying a graphical representation of the hierarchical structure of the asset relational database in a graphical user interface;
    receiving a user input selecting an asset node of the hierarchical structure from the graphical representation;
    displaying, in the graphical user interface, a hierarchical search template based on the selected asset node of the hierarchical structure, the hierarchical search template having a hierarchical tree shape comprised of a plurality of superior and subordinate levels;
    searching the asset relational database with a search query corresponding to the hierarchical search template to identify one or more matching asset nodes, the searching comprising locating branches of the hierarchical structure of the asset relational database that match the hierarchical tree structure specified in the hierarchical search template;
    retrieving from the time series database a portion of the time series data corresponding to the matching asset nodes; and
    generating a data report based on the retrieved portion of the time series data.

12. The non-transitory computer readable storage medium of claim 11, further comprising instructions causing the processor to performs the steps of:
    displaying a plurality of attributes of the asset node in the user interface;
    receiving a user input selecting an attribute from the plurality of attributes; and
    adding the attribute to the hierarchical search template.

13. The non-transitory computer readable storage medium of claim 11, wherein retrieving the portion of the time series data corresponding to the matching asset nodes comprises retrieving a portion of the time series data corresponding to the matching asset nodes based on the attribute of the hierarchical search template.

14. The non-transitory computer readable storage medium of claim 13, wherein an attribute is a static value, a reference to the time series data, a calculation based on time series data or static values, or a reference to another asset.

15. The non-transitory computer readable storage medium of claim 11, further comprising instructions causing the processor to form the step of converting the selected asset node in the hierarchical search template into a flexible search node.

16. The non-transitory computer readable storage medium of claim 11, wherein the asset relationship database is searched with holistic twig pattern matching.

17. The non-transitory computer readable storage medium of claim 11, further comprising instructions causing the processor to perform the steps of:
    accessing an event relational database having a plurality of event frames, each event frame associated with an asset node from the plurality of assets and a timeframe for an event;
    receiving a user input selecting an event frame from the plurality of event frames; and
    filtering the identified time series data based on the event frame, wherein the data report is generated based on the filtered time series data.

18. The non-transitory computer readable storage medium of claim 17, further comprising instructions causing the processor to perform the steps of:
    displaying a graphical representation of the event relational database in a graphical user interface;
    receiving a user input selecting at least one event frame from the graphical representation of the event relational database;
    displaying, in the graphical user interface, a search template based on the selected at least one event frames;
    searching the event relational database with a search query corresponding to the search template to identify one or more matching event frames;
    retrieving from the time series database a portion of the time series data corresponding to the matching event frames;
    accessing the asset relational database;
    receiving a user input selecting at least one asset node from the plurality of asset nodes; and
    filtering the retrieved time series data based on the at least one asset node, wherein the data report is generated based on the filtered time series data;
    generating a data report based on the retrieved portion of the time series data.

19. The non-transitory computer readable storage medium of claim 11, wherein creating a data report comprises interpolating the retrieved time series data based on a selected sampling interval.

20. The non-transitory computer readable storage medium of claim 11, wherein creating a data report further comprises creating an xml script representing the report.

\* \* \* \* \*

UNITED STATES PATENT AND TRADEMARK OFFICE
CERTIFICATE OF CORRECTION

PATENT NO. : 10,198,159 B2
APPLICATION NO. : 15/084404
DATED : February 5, 2019
INVENTOR(S) : Matthew James Ziegler et al.

Page 1 of 1

It is certified that error appears in the above-identified patent and that said Letters Patent is hereby corrected as shown below:

In the Claims

Column 18, Line 60, Claim 12 delete "to performs the steps of" and insert --to perform the steps of--

Signed and Sealed this
Twenty-eighth Day of January, 2020

Andrei Iancu
*Director of the United States Patent and Trademark Office*